(12) United States Patent
Zhang et al.

(10) Patent No.: US 7,898,770 B1
(45) Date of Patent: Mar. 1, 2011

(54) DISK DRIVE SUSPENSION ASSEMBLY WITH A HINGE ARM ATTACHED AT A RECESSED SURFACE

(75) Inventors: Yiduo Zhang, Cupertino, CA (US);
Yih-Jen D. Chen, Fremont, CA (US);
Martin J. McCaslin, Pleasanton, CA (US); Tzong-Shii Pan, San Jose, CA (US); Drew B. Lawson, Los Gatos, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/782,555

(22) Filed: May 18, 2010

Related U.S. Application Data

(62) Division of application No. 11/518,062, filed on Sep. 8, 2006.

(51) Int. Cl.
*G11B 5/48* (2006.01)
*G11B 5/127* (2006.01)
(52) U.S. Cl. .................. 360/244.5; 360/266.1
(58) Field of Classification Search .............. 360/244.2, 360/244.5, 244.8, 294.4, 266.1
See application file for complete search history.

(56) References Cited

U.S. PATENT DOCUMENTS

| | | | |
|---|---|---|---|
| 4,912,583 A | 3/1990 | Hinlein | |
| 4,947,275 A | 8/1990 | Hinlein | |
| 5,003,420 A | 3/1991 | Hinlein | |
| 5,313,355 A | 5/1994 | Hagen | |
| 6,088,192 A | 7/2000 | Riener et al. | |
| 6,738,229 B2 | 5/2004 | Williams | |
| 6,778,362 B1 | 8/2004 | Davis et al. | |
| 6,958,879 B2 | 10/2005 | Oh et al. | |
| 7,408,743 B1 | 8/2008 | McCaslin et al. | |
| 7,417,830 B1 | 8/2008 | Kulangara | |
| 7,542,239 B2 | 6/2009 | Resh et al. | |
| 7,573,680 B1 | 8/2009 | Kulangara | |
| 2005/0007701 A1 | 1/2005 | Oh et al. | |
| 2005/0068655 A1 | 3/2005 | Pit et al. | |
| 2007/0188926 A1 | 8/2007 | Kushima | |

OTHER PUBLICATIONS

J. C. Harrison and K. P. Hanrahan (1995), "Effect of Mandrel Skew Induced Roll Bias on Suspension Structural Resonance", Advances in Information Storage Systems, vol. 6, pp. 29-40.

*Primary Examiner*—Brian E Miller

(57) ABSTRACT

A disk drive suspension assembly includes a load beam, a first hinge arm, a second hinge arm, a base plate, and a flexure that includes a head mounting surface. The base plate has a first base plate layer that includes a first base plate side and an opposing second base plate side. The first base plate side has a main base plate surface and a recessed base plate surface parallel to and offset from the main base plate surface. A first hinge arm is attached to the main base plate surface. A second hinge arm is attached to the recessed base plate surface. The first and second hinge arms are attached to the load beam. The base plate has a first thickness at the main base plate surface and a second thickness at the recessed base plate surface that is the same as the first thickness.

20 Claims, 24 Drawing Sheets

DISK DRIVE SUSPENSION ASSEMBLY WITH A HINGE ARM ATTACHED AT A RECESSED SURFACE

CROSS-REFERENCE TO RELATED APPLICATION

This application is a divisional patent application of pending U.S. patent application Ser. No. 11/518,062, entitled DISK DRIVE SUSPENSION ASSEMBLY WITH A HINGE ARM ATTACHED AT A RECESSED SURFACE, filed on Sep. 8, 2006, which is incorporated herein by reference.

BACKGROUND

The typical hard disk drive includes a head disk assembly (HDA) and a printed circuit board assembly (PCBA) attached to a disk drive base of the HDA. The HDA includes at least one disk, a spindle motor for rotating the disk, and a head stack assembly (HSA). The PCBA includes a disk controller for generating servo control signals. The HSA includes a head for reading and writing data from and to the disk. The HSA is controllably positioned in response to the generated servo control signals from the disk controller to move the head relative to tracks of the disk.

The HSA includes an actuator, at least one head gimbal assembly (HGA), and a flex cable assembly. The actuator includes an actuator body with one or more actuator arms extending from the actuator body. Each actuator arm supports the HGA that includes a head. An actuator coil is supported by the actuator body. The actuator coil interacts with a magnet to form a voice coil motor. The PCBA controls current passing through the actuator coil that results in a torque being applied to the actuator. The HSA further includes the flex cable assembly in electrical communication with the PCBA. The flex cable assembly supplies current to the coil and carries signals between the head and the PCBA.

Each HGA is attached to a distal end of one of the actuator arms and includes a suspension assembly that supports a head. The suspension assembly includes a base plate that is swage attached to the distal end of the actuator arm. The suspension assembly further includes a load beam and a pair of hinge arms that are each disposed between the swage plate and the load beam. The hinge arms are attached to the load beam with the load beam extending distally from the hinge arms and the actuator arm. The hinge arms allow the load beam to move the attached head relative to the actuator arm.

Disk flutter refers to one or more disk modes of vibration, wherein as the disk vibrates, at least a portion of the disk moves up and down (i.e., along the disk axis of rotation). Disk flutter is one of the known causes of mis-registration between the head and information tracks on the disk surface, known as "track mis-registration" or "TMR."

An approach to compensate for disk flutter induced TMR is to change the design of the suspension assembly so as to vertically offset one of the hinge arms through the use of two small spacers. One of the spacers is inserted between the load beam and the hinge arm, and the other one of the spacers is inserted between the base plate and the hinge arm. Such a hinge offset can introduce a radial component to otherwise vertical head motion, the radial component being intended to at least partially cancel TMR. While such spacer offset approach can be effective in at least partially compensating for disk flutter induced off-track motion, this approach also introduces two additional spacers and increased assembly complexity. Therefore, there is a need in the art to find a way to reduce an increase in off-track motion due to disk flutter, while avoiding an increase in components and/or manufacturing complexity in comparison to the prior art.

DESCRIPTION OF THE EXAMPLE EMBODIMENTS

Figure 1:
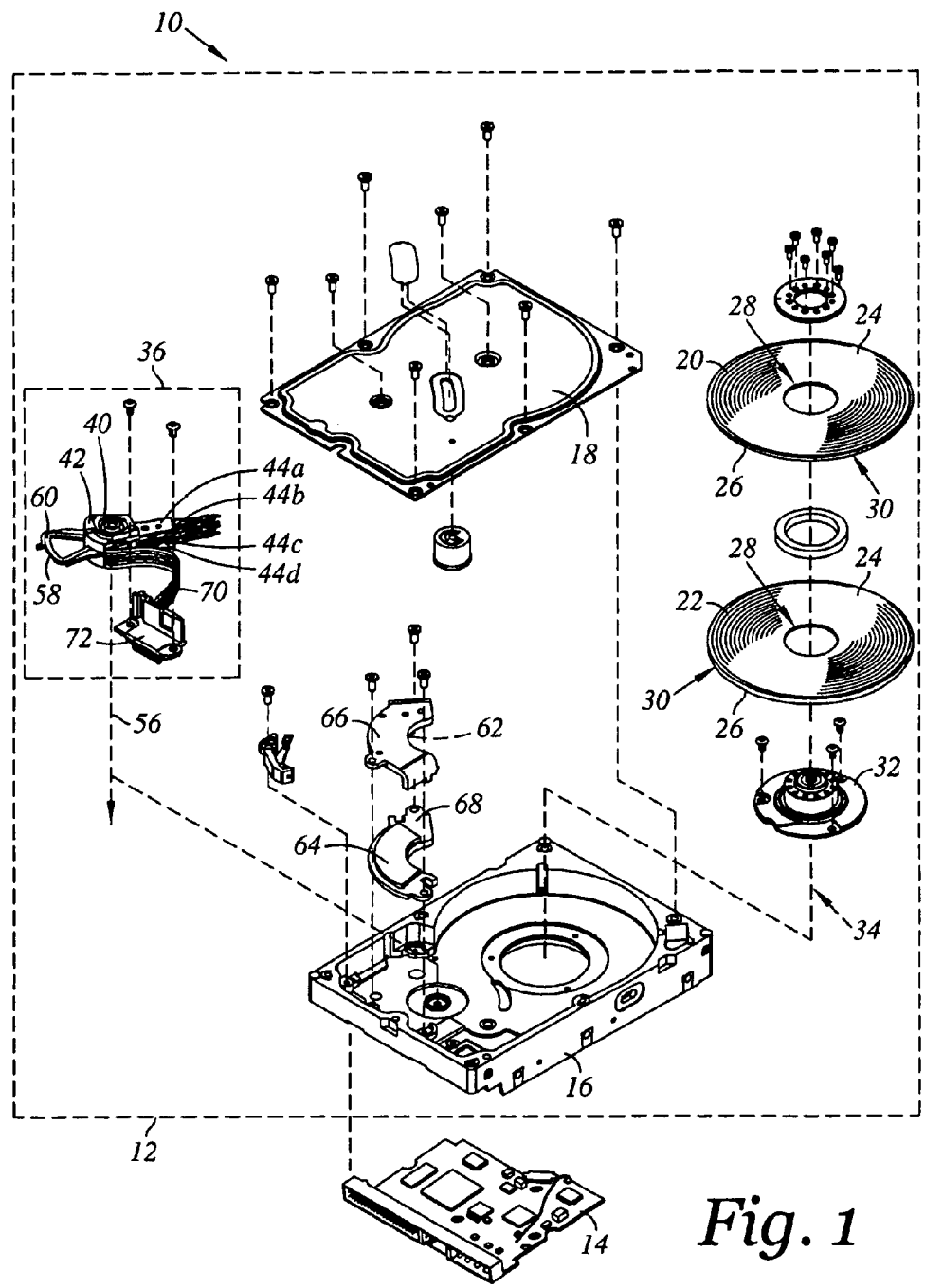
FIG. 1 is an exploded top perspective view of a disk drive compatible with a head stack assembly of an exemplary embodiment of the present invention.

Referring now to FIG. 1, there is depicted an exploded perspective view of a disk drive 10 capable of incorporating an embodiment of the present invention (details of which are discussed below and shown in additional figures). The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house disks 20, 22. A single disk or additional disks may be utilized. Each of the disks 20, 22 includes opposing disk upper and lower surfaces 24, 26, an inner diameter (ID) 28, an outer diameter (OD) 30, and a plurality of tracks for storing data disposed between the inner and outer diameters 28, 30. The disks 20, 22 may be of a magnetic recording type of storage device, however, other arrangements such as optical recording may be utilized.

The head disk assembly 12 further includes a spindle motor 32 for rotating the disks 20, 22 about a disk rotation axis 34. The head disk assembly 12 further includes a head stack assembly 36. The head stack assembly 36 is rotatably attached to the disk drive base 16 in operable communication with the disks 20, 22. The head stack assembly 36 includes a rotary actuator 40.

Figure 2:
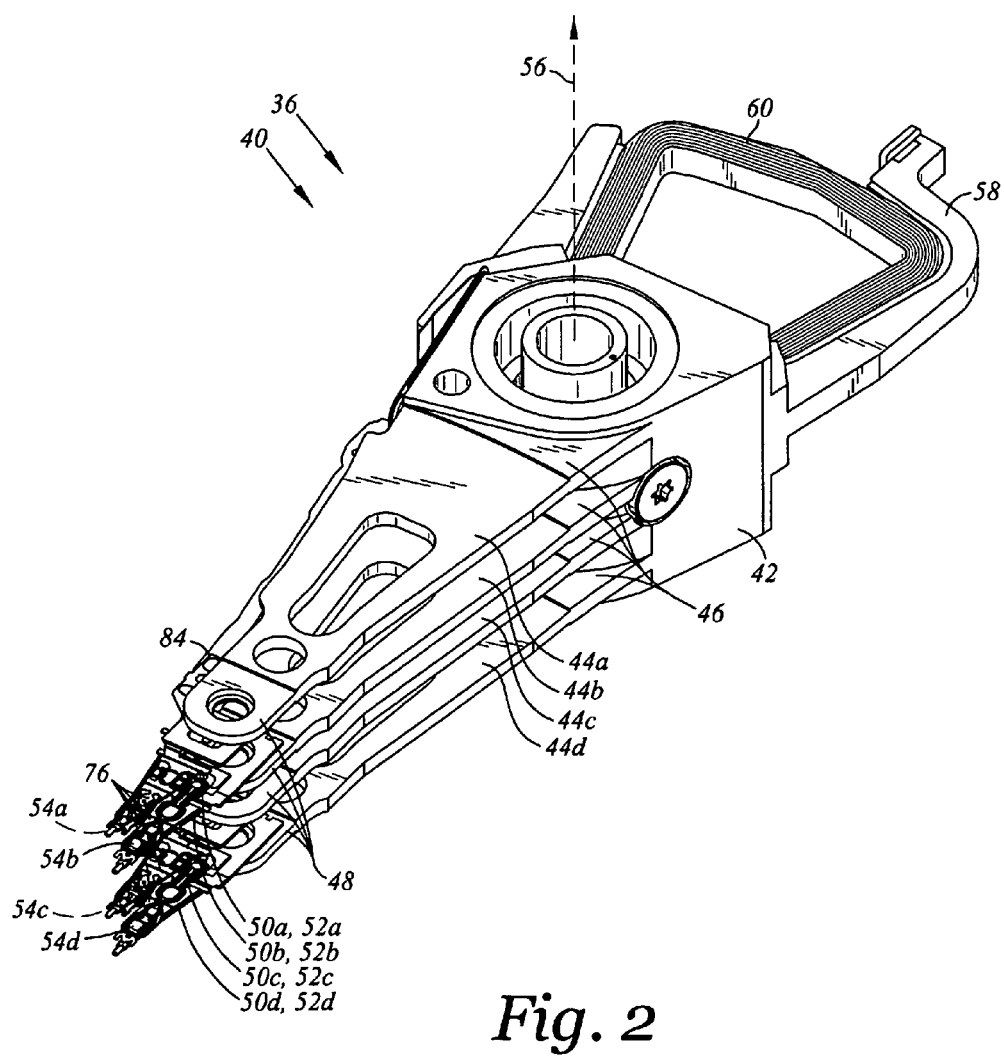
FIG. 2 is an enlarged perspective top view of the head stack assembly of FIG. 1.

Referring additionally to FIG. 2, there is depicted an enlarged perspective top view of the head stack assembly 36. The rotary actuator 40 includes an actuator body 42 and actuator arms 44 (individually denoted 44a-d) that extend from the actuator body 42. Each of the actuator arms 44 has a proximal end 46 attached to the actuator body 42 and a distal end 48. In the embodiment shown, head gimbal assemblies 50a-d are distally respectively attached to the actuator arms 44a-d at the distal ends 48. Each of the head gimbal assemblies 50a-d includes suspension assemblies 52a-d that respectively support heads 54a-d (in FIG. 2, heads 54a and c are denoted with dashed lining as it is understood that each is respectively disposed at an underside of the suspension assemblies 52a and c). It is contemplated that the number of actuator arms and head gimbal assemblies may vary depending upon the number of disks and disk surfaces utilized.

Figure 3:
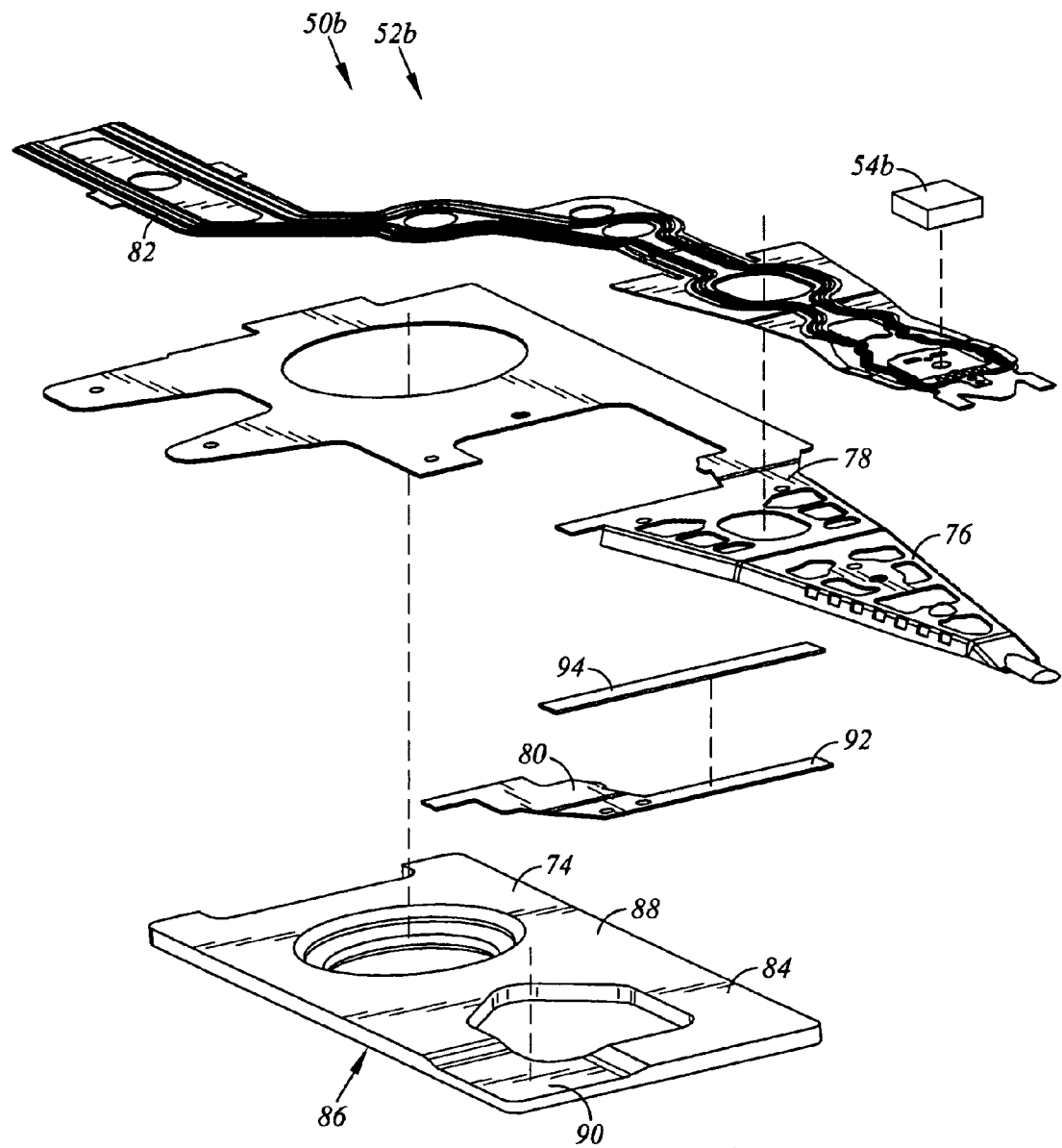
FIG. 3 is an enlarged exploded perspective top view of a head gimbal assembly of the head stack assembly of the disk drive of FIG. 1, of an embodiment of the present invention.
Figure 4:
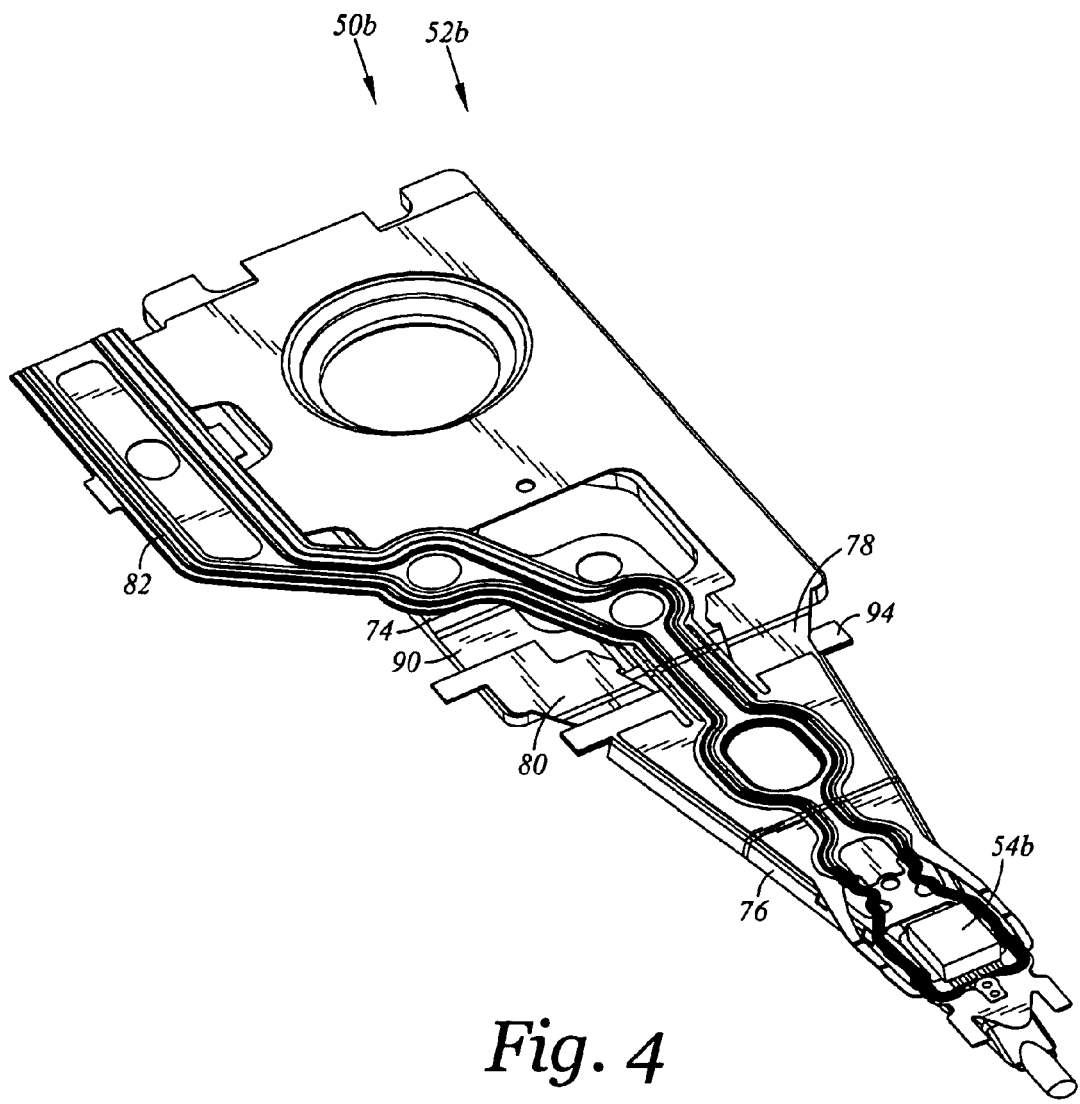
FIG. 4 is the head gimbal assembly of FIG. 3 as assembled.
Figure 5:
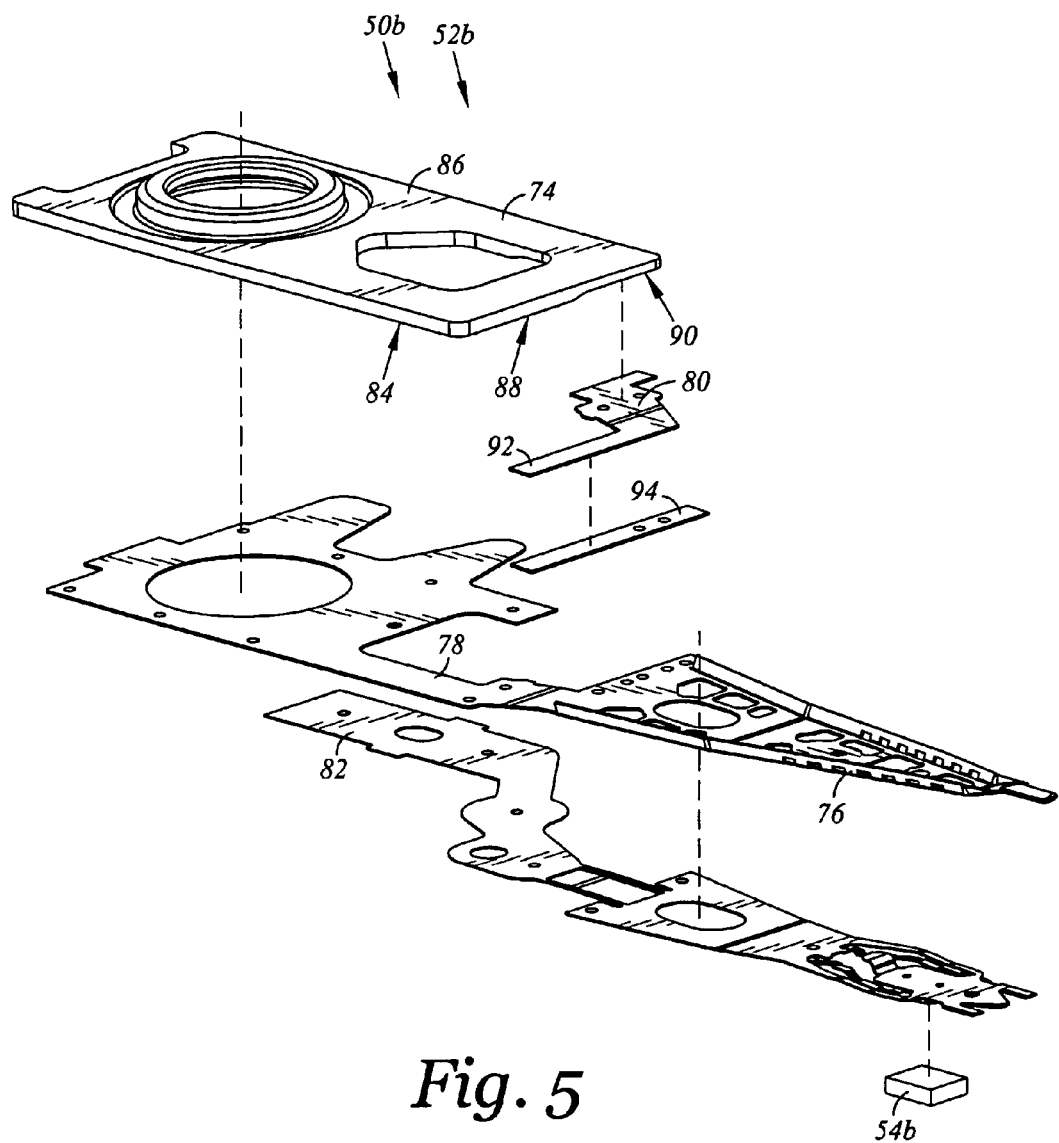
FIG. 5 is an exploded perspective bottom view of a head gimbal assembly of the head stack assembly of FIG. 3.
Figure 6:
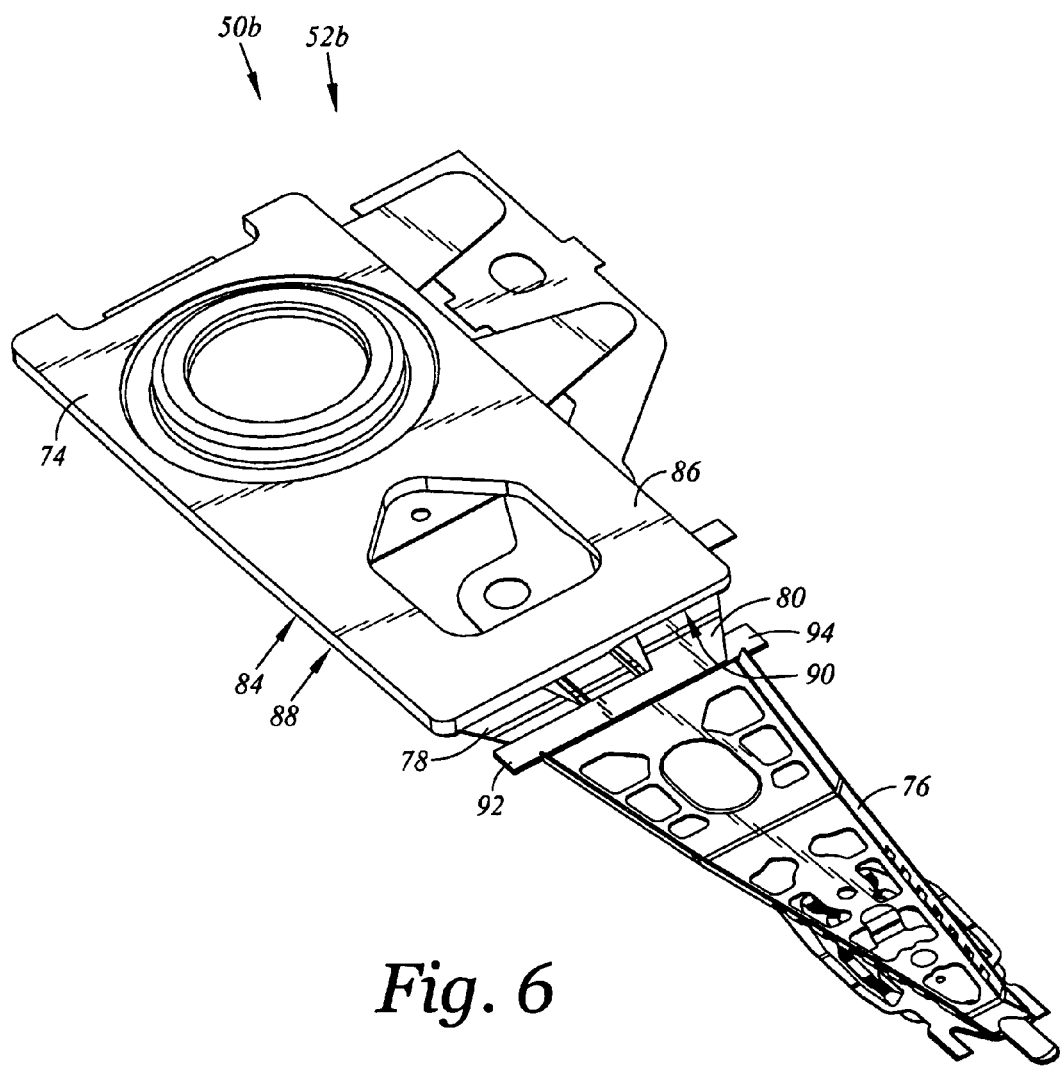
FIG. 6 is the head gimbal assembly of FIG. 5 as assembled.
Figure 7:
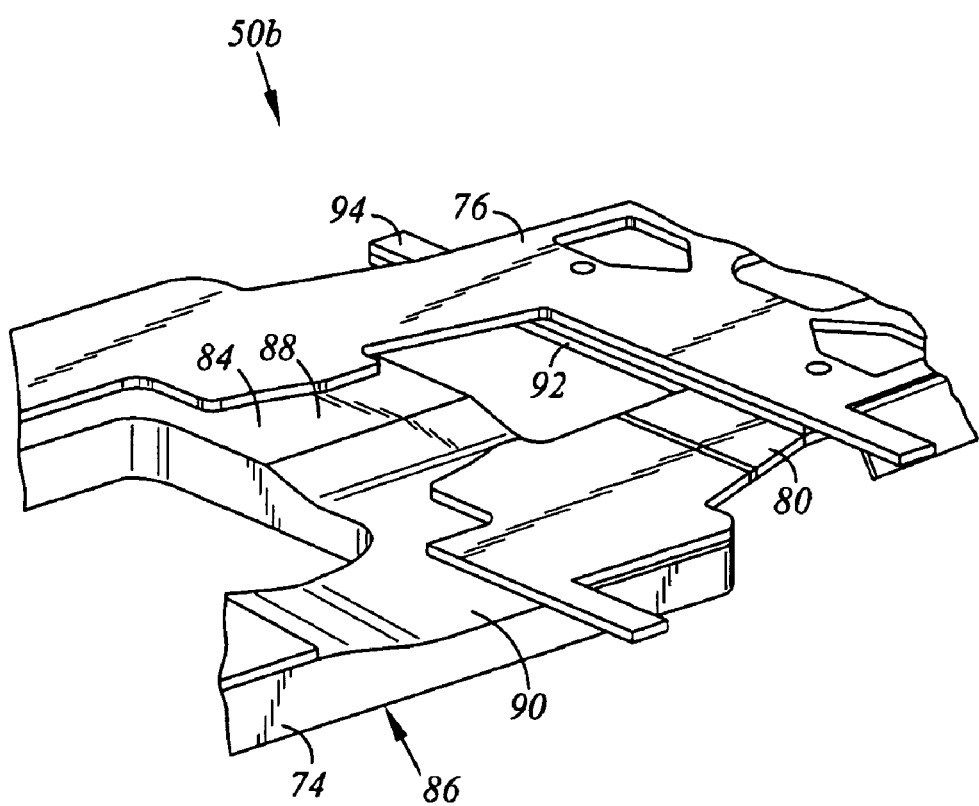
FIG. 7 is an enlarged perspective view of a portion of the head gimbal assembly of FIG. 4 as viewed from another angle.

Referring additionally to FIGS. 3-7, FIG. 3 is an enlarged perspective top view of head gimbal assembly 50b, and FIG. 4 is the head gimbal assembly 50b of FIG. 3 as assembled. Further, FIG. 5 is an enlarged perspective bottom view of the head gimbal assembly 50b, and FIG. 6 is the head gimbal assembly 50b of FIG. 5 as assembled. FIG. 7 is an enlarged perspective view of a portion of the head gimbal assembly 50b of FIG. 4 as viewed from another angle.

The head 54b is configured to interact with the lower surface 26 of the disk 20. Each of the heads 54a-d typically includes a transducer for writing and reading data. At the least, each transducer includes a read element and may additionally include a writer. In this regard, each of the heads 54a-d may be referred to as a read head. In magnetic recording applications, the transducer's writer may be of a longitudinal or perpendicular design, and the read element of the transducer may be inductive or magnetoresistive. In optical and magneto-optical recording applications, the head 54 may also include an objective lens and an active or passive mechanism for controlling the separation of the objective lens from a disk surface of the disks 20, 22. Each of the disks 20, 22 includes opposing disk surfaces. In magnetic recording applications the disk surface typically includes one or more magnetic layers. Data may be recorded along data annular regions on a single disk surface or both.

The head stack assembly 36 may be pivoted such that each of the heads 54a-d is disposed adjacent to the various data annular regions from adjacent the outer diameter 30 to adjacent the inner diameter 28 of each of the disks 20, 22. In the embodiment shown, the actuator body 42 includes a bore, and the rotary actuator 40 further includes a pivot bearing cartridge engaged within the bore for facilitating the actuator body 42 to rotate between limited positions about an axis of rotation 56. The rotary actuator 40 further includes a coil support 58 that extends from one side of the actuator body 42 opposite the actuator arms 44. The coil support 58 is configured to support an actuator coil 60.

First and second magnets 62, 64 are supported by magnet supports 66, 68 which are attached to the disk drive base 16 (the first magnet 62 is denoted in dashed lining and it is understood that it is disposed at an underside of the magnet support 66). The actuator coil 60 interacts with the first and second magnets 62, 64 to form a voice coil motor for controllably rotating the actuator 40. The head stack assembly 36 further includes a flex cable assembly 70 and a cable connector 72. The cable connector 70 is attached to the disk drive base 16 and is disposed in electrical communication with the printed circuit board 14. The flex cable assembly 70 supplies current to the actuator coil 60 and carries signals between the heads 54a-d and the printed circuit board assembly 14.

In the embodiment shown, each of the suspension assemblies 52a-d includes a base plate 74 that is swage attached to the distal end 48 of a respective one of the actuator arms 44a-d. The base plate 74 may sometime be referred to as a swage plate. Each of the suspension assemblies 52a-d further includes a load beam 76 and first and second hinge arms 78, 80. Each of the first and second hinge arms 78, 80 extends between the base plate 74 and the load beam 76. Each load beam 76 respectively extends from the actuator arms 44a-d via the various pairs of the first and second hinge arms 78, 80. Where the hinge arms 78, 80 are integrated with the load beam 76, the hinge arms 78, 80 may be referred to as a bend area of the load beam 76.

The first and second hinge arms 78, 80 make the load beam 76 compliant in a direction normal to the respective disks 20, 22 to allow an air bearing to position the associated head 54 at a desired fly height above the respective one of the disks 20, 22. The first and second hinge arms 78, 80 may be initially plastically deformed through a macroscopic angle so that when they are elastically straightened during disk drive assembly they can provide a pre-load force upon the head 54 against the respective one of the disks 20, 22. The pre-load force is commonly referred to as a "gram load" because it is typically measured in grams.

A flexure 82 corresponds to each of the head gimbal assemblies 50a-d and is electrically connected to the flex cable assembly 70. The flexure 82 may be referred to as a trace assembly. The flexure 82 extends along each of the actuator arms 44. The flexure 82 includes a head mounting surface 83.

The heads 54*a-d* are attached to and electrically connected to the flexure 82 and the head mounting surface 83.

According to an aspect of the present invention, there is provided a head gimbal assembly, such as the head gimbal assembly 50*b*, for use with the disk drive 10. The head gimbal assembly 50*b* includes the base plate 74, the first hinge arm 78, the second hinge arm 80, the load beam 76, and the read head 54*b*. The base plate 74 has a first base plate side 84 and an opposing second base plate side 86. In this embodiment, the first base plate side 84 has a main base plate surface 88 and a recessed base plate surface 90 parallel to and offset from the main base plate surface 88. The first hinge arm 78 is attached to the main base plate surface 88. The second hinge arm 80 is attached to the recessed base plate surface 90. The first and second hinge arms 78, 80 are further attached to the load beam 76. The flexure 82 includes the head mounting surface 83 mechanically coupled to the load beam 76.

In the particular embodiment shown, the second hinge arm 80 includes an extension portion 92. The extension portion 92 may extend widthwise along the load beam 76. The head gimbal assembly 50*b* may further include a shim 94. The shim 94 is disposed between the second hinge arm 80 and the load beam 76. The shim 94 is layered with the extension portion 92 of the second hinge arm 80. The extension portion 92 and the shim 94 facilitate the attachment of the first and second hinge arms 78, 80 in a manner that allows the load beam 76 to lie flat with respect to the base plate 74 and orthogonal to the axis of rotation 56. The second hinge arm 80 is thus offset from the load beam 76 at the location where it is coupled to the load beam 76 through the use of the shim 94. Other relative thicknesses of the shim 94 may be utilized to achieve a varying degree of offset between the second hinge arm 80 and the load beam 76. The shim 94 may have a shim thickness in the range of 15 microns to 70 microns, for an example range.

As mentioned above, the recessed base plate surface 90 is parallel to and offset from the main base plate surface 88. This results in the first and second hinge arms 78, 80 becoming offset with respect to each other at their respective attachment locations to the base plate 74. As the first and second hinge arms 78, 80 are flexed to allow the head 54*b* to move up and down, the load beam 76 also moves the head 54*b* in a radial direction with respect to the disk 20.

The amount of offset of the first and second hinge arms 78, 80 may be used to compensate for the radial displacement of the tracks on the lower surface 26 due to the disk 20 flexing during disk vibration.

The sizing, geometry, angulation and thickness of the first and second hinge arms 78, 80 may vary. For example, in this embodiment, the first hinge arm 78 and the load beam 76 are both a single component having material continuity rather than an assembly of subcomponents. The first hinge arm 78 may be a separate component that is attached to the load beam 76. Further in this embodiment, the first and second hinge arms 78, 80 are substantially flat. While the thicknesses of the first and second hinge arms 78, 80 are shown as being uniform they may have a non-uniform thicknesses.

The recessed base plate surface 90 may be formed through various techniques such as the base plate 74 being etched, machined, or stamped for examples. The recessed base plate surface 90 may be offset from the main base plate surface 88 in the range of 30 microns to 100 microns, for an example range. The base plate 74 has a first thickness at the main base plate surface 88 and a second thickness at the recessed base plate surface 90 that is less than the first thickness such as shown. Other relative offsets may be used. For example the amount of offset may be equal to or greater than a thickness of the base plate 74 at the main base plate surface 88.

Figure 8:
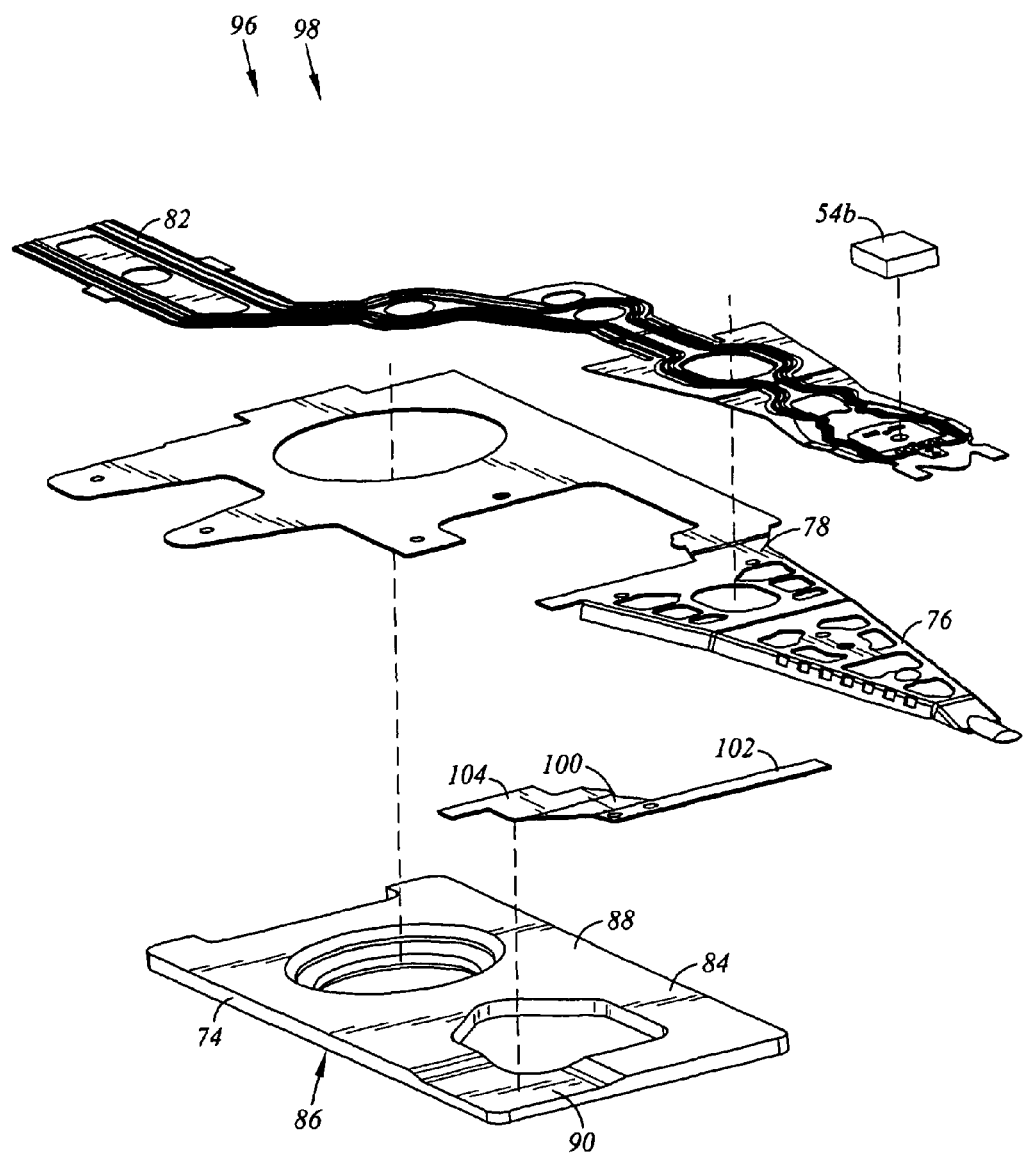
FIG. 8 is an enlarged exploded perspective top view of a head gimbal assembly of the head stack assembly of the disk drive of FIG. 1, of another embodiment of the present invention.
Figure 9:
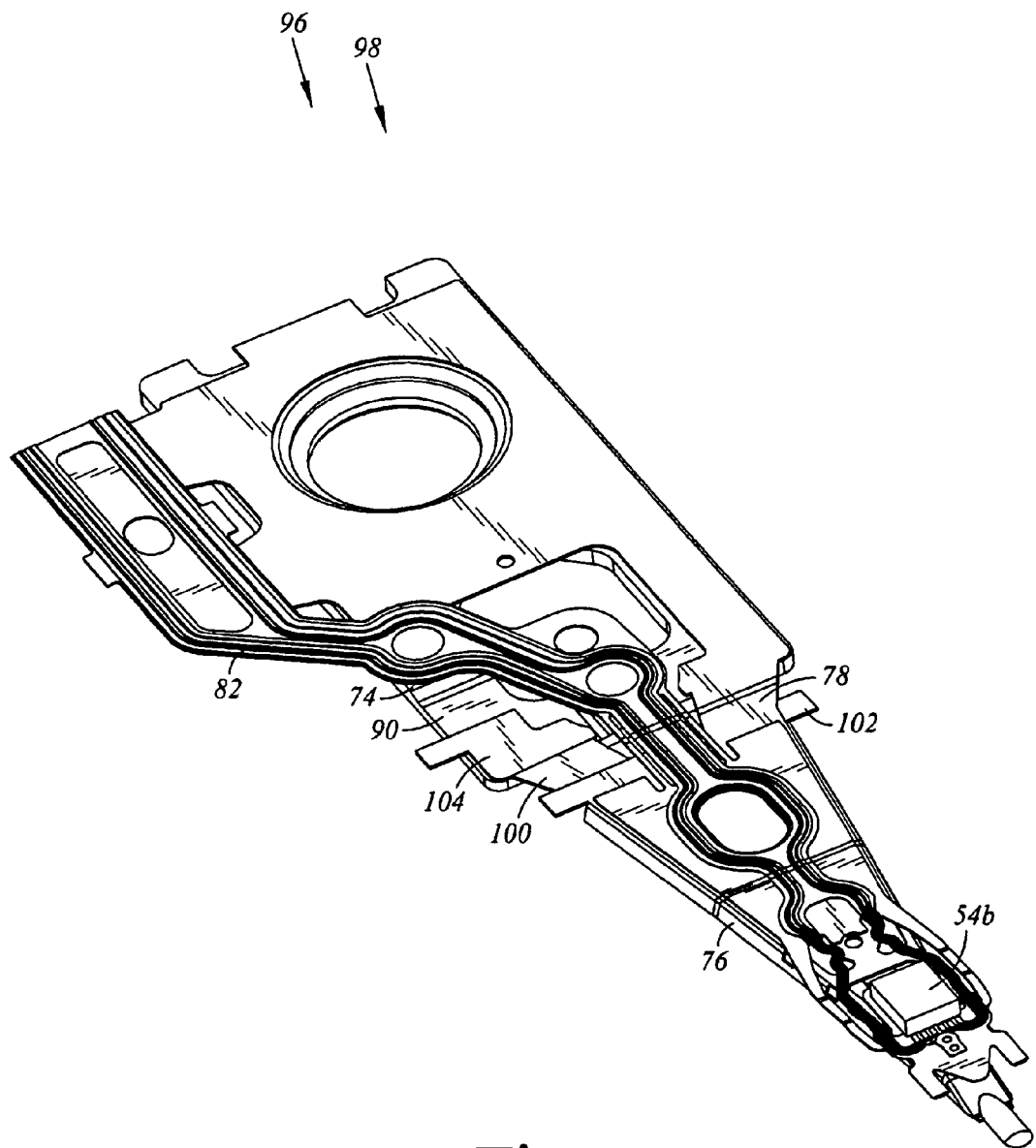
FIG. 9 is the head gimbal assembly of FIG. 8 as assembled.
Figure 10:
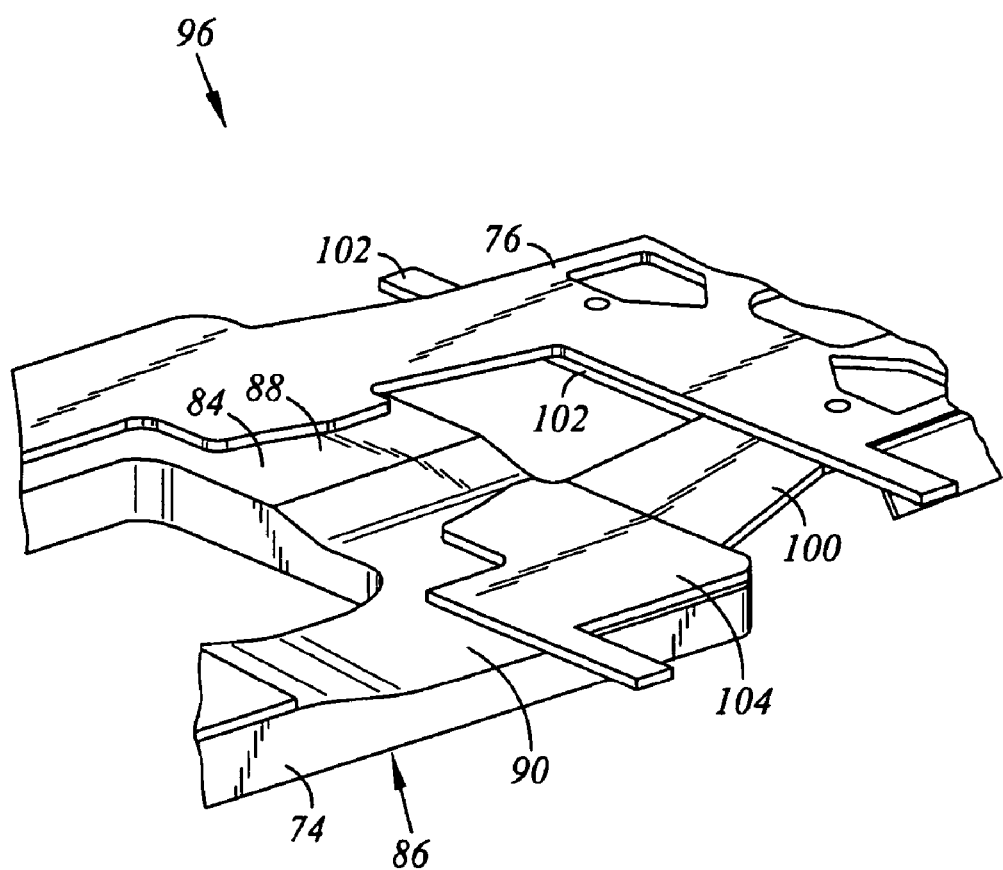
FIG. 10 is an enlarged perspective view of a portion of the head gimbal assembly of FIG. 9 as viewed from another angle.

Referring now to FIGS. 8-10, there is depicted another embodiment. Similar reference numerals as those in relation to the embodiments shown in FIGS. 3-7 are used to indicate similarly configured components.

FIGS. 8-10 depict views similar to those portions of the head stack assembly 50*b* respectively of FIGS. 3, 4 and 7. However, in this embodiment, there is depicted a head gimbal assembly 96 that includes a suspension assembly 98 and the read head 54*b*. The head gimbal assembly 96 includes the base plate 74, the load beam 76 that includes the first hinge arm 78, and the trace assembly 82. Unlike the embodiment of FIGS. 3-7, this embodiment includes a second hinge arm 100 that includes a Z-shaped angulation and thereby avoids use of any shim. The second hinge arm 100 has a load beam attachment portion 102 and a base plate attachment portion 104. The second hinge arm 100 is attached to the load beam 76 with the load beam attachment portion 102. The second hinge arm 100 is attached to the recessed base plate surface 90 with the base plate attachment portion 104. The second hinge arm 100 is angled between the load beam attachment portion 102 and the base plate attachment portion 104, in comparison to the first hinge arm 78. The load beam attachment portion 102 and the base plate attachment portion 104 are offset with respect to each other.

Figure 11:
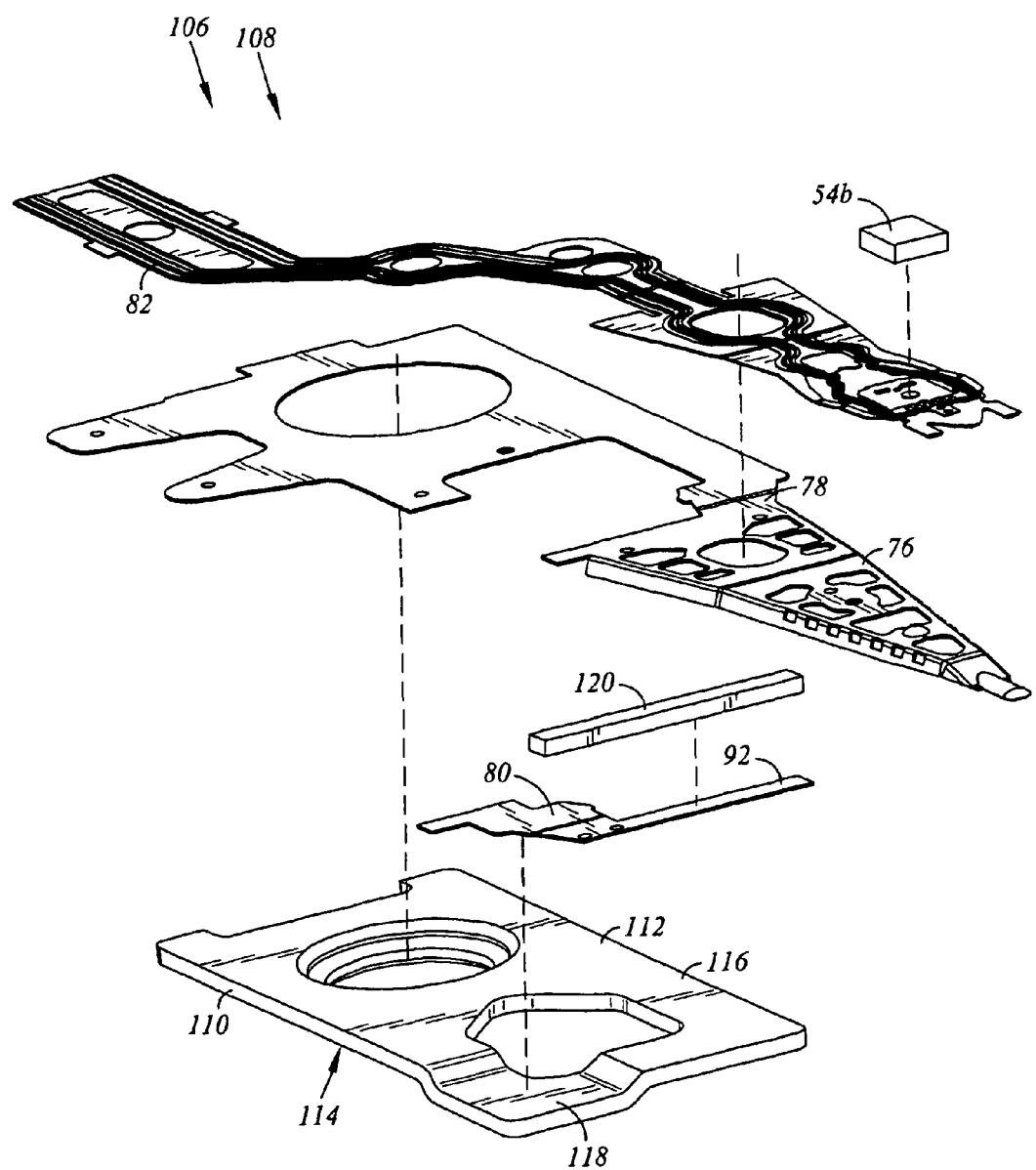
FIG. 11 is an enlarged exploded perspective top view of a head gimbal assembly of the head stack assembly of the disk drive of FIG. 1, of another embodiment of the present invention.
Figure 12:
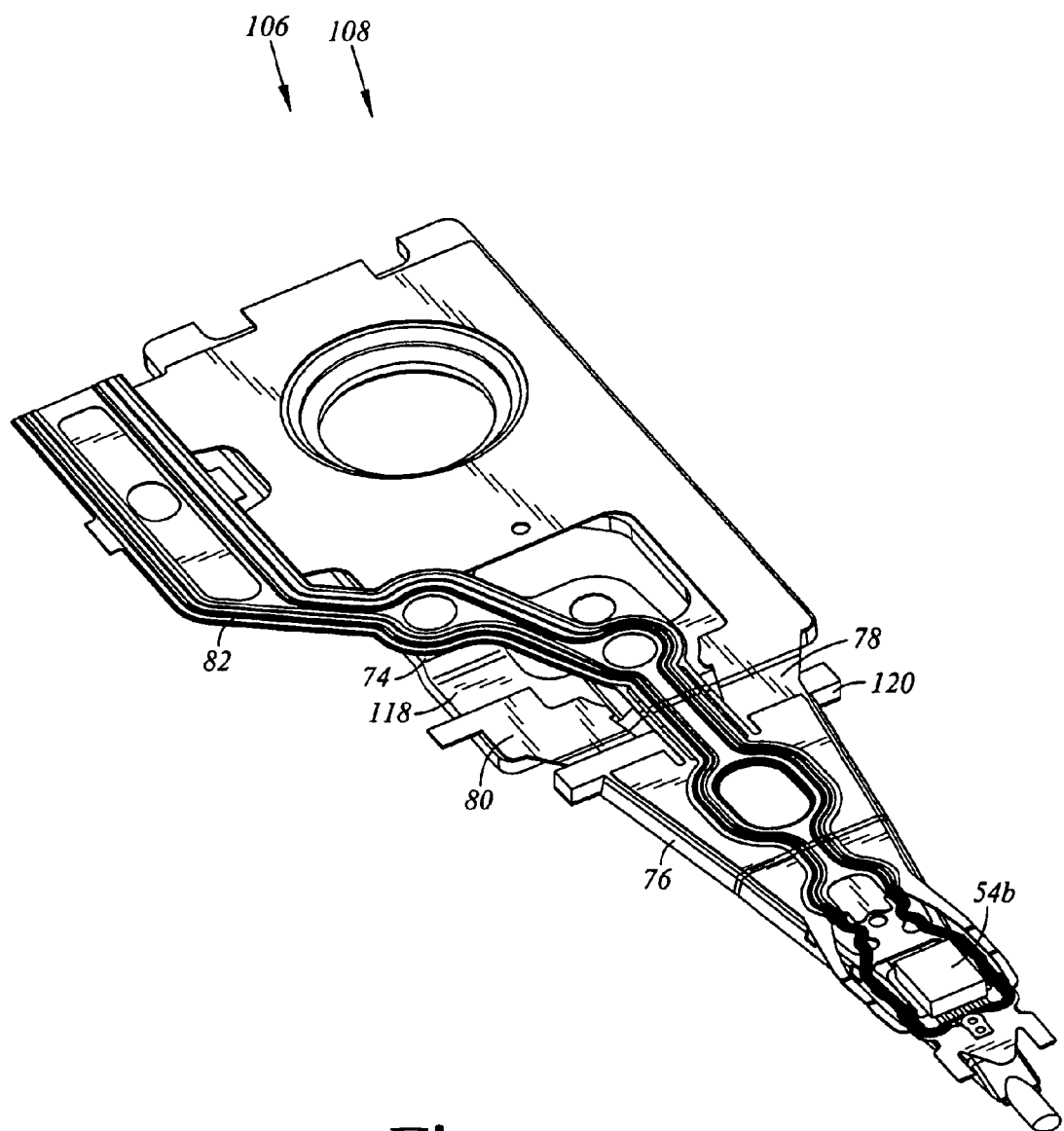
FIG. 12 is the head gimbal assembly of FIG. 11 as assembled.
Figure 13:
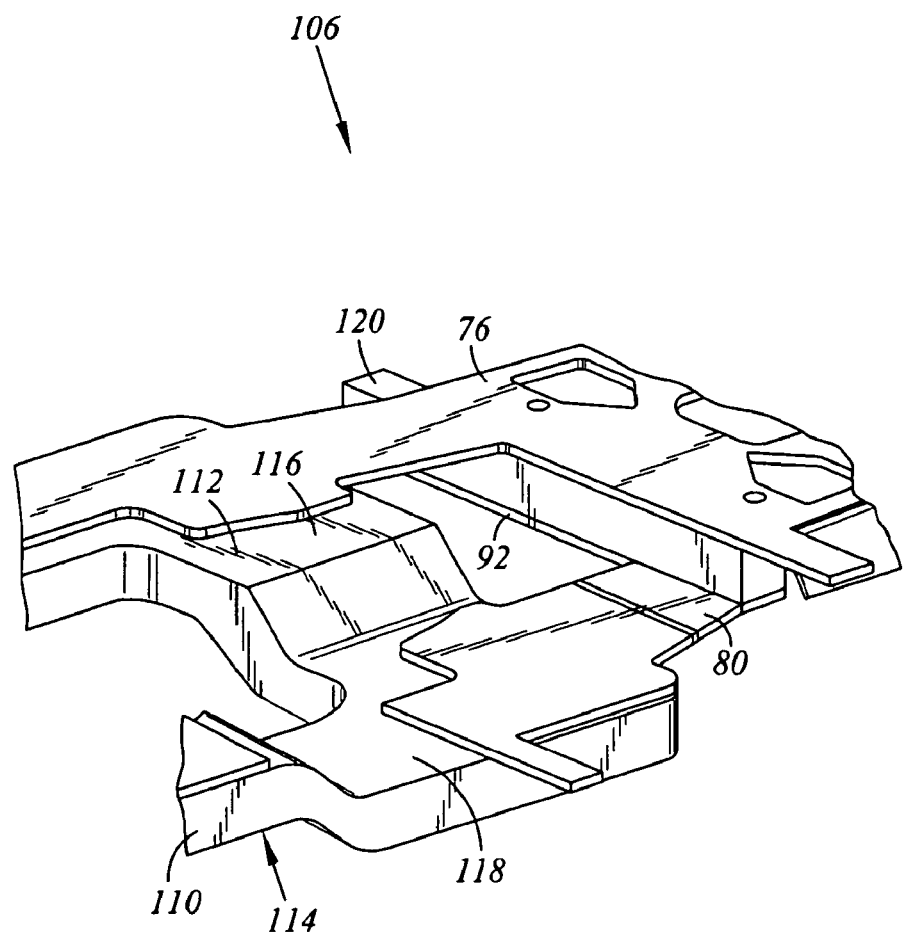
FIG. 13 is an enlarged perspective view of a portion of the head gimbal assembly of FIG. 12 as viewed from another angle.

Referring now to FIGS. 11-13, there is depicted another embodiment. Similar reference numerals as those in relation to the embodiments shown in FIGS. 3-7 are used to indicate similarly configured components.

FIGS. 11-13 depict views similar to those portions of the head stack assembly 50*b* respectively of FIGS. 3, 4 and 7. In this embodiment, there is depicted a head gimbal assembly 106 that includes a suspension assembly 108 and the read head 54*b*. The head gimbal assembly 106 includes the load beam 76 that includes the first hinge arm 78, the second hinge arm 80 and the trace assembly 82. The embodiment of FIGS. 11-13 includes a base plate 110. The base plate 110 includes a first base plate side 112 and an opposing second base plate side 114. The first base plate side 112 includes a main base plate surface 116 and a recessed base plate surface 118 parallel to and offset from the main base plate surface 116. This embodiment also includes a shim 120. Because the recessed base plate surface 118 is offset from the main base plate surface 116 in a greater amount than the recessed base plate surface 90 is offset from the main base plate surface 88 of the base plate 74, the shim 120 is thicker than the shim 94. The second hinge arm 80 has an extension portion 92. The second hinge arm 80 is angled between the extension portion 92 and the contact location with the base plate 110 at the recessed base plate surface 118.

Figure 14:
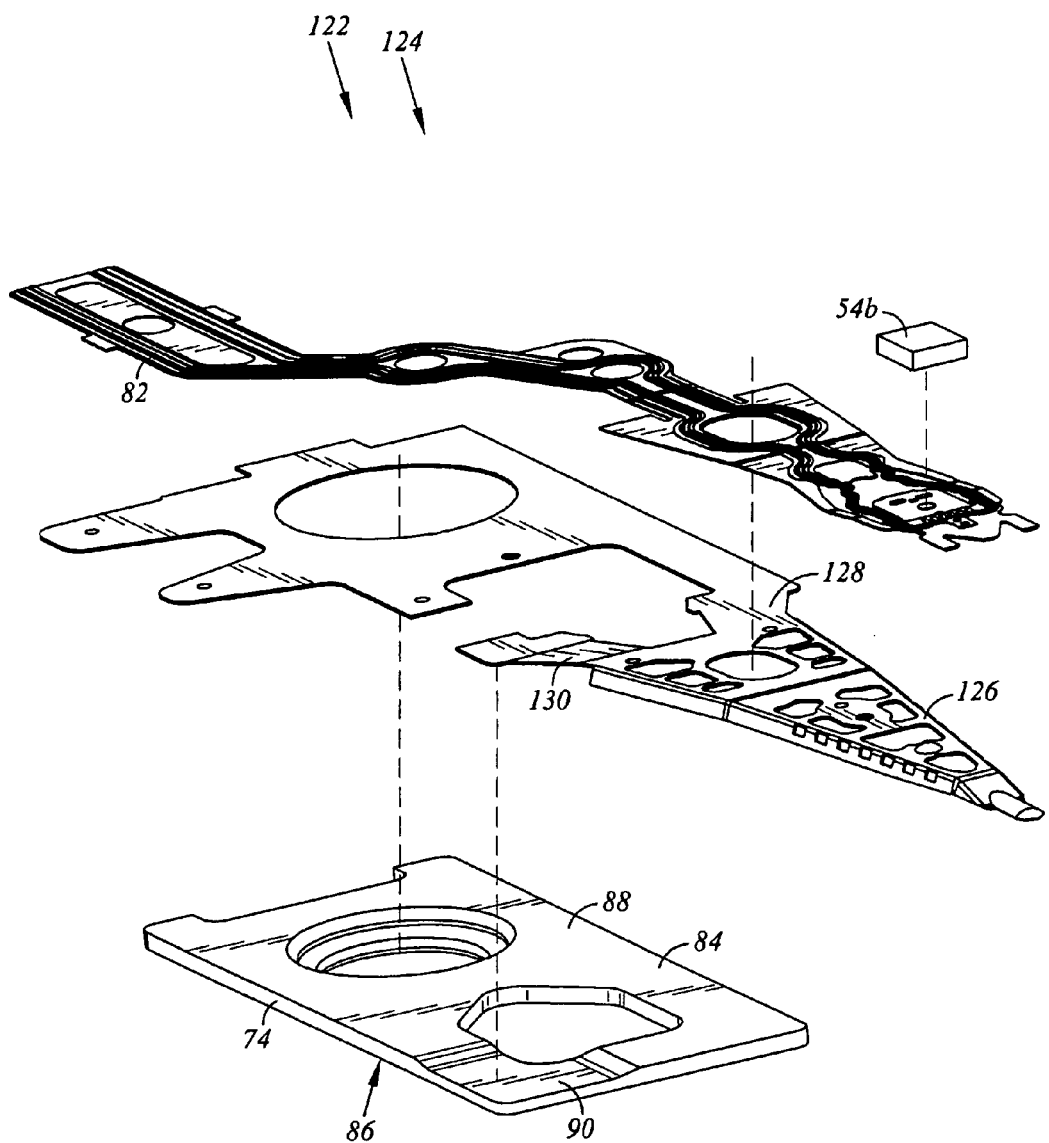
FIG. 14 is an enlarged exploded perspective top view of a head gimbal assembly of the head stack assembly of the disk drive of FIG. 1, of another embodiment of the present invention.
Figure 15:
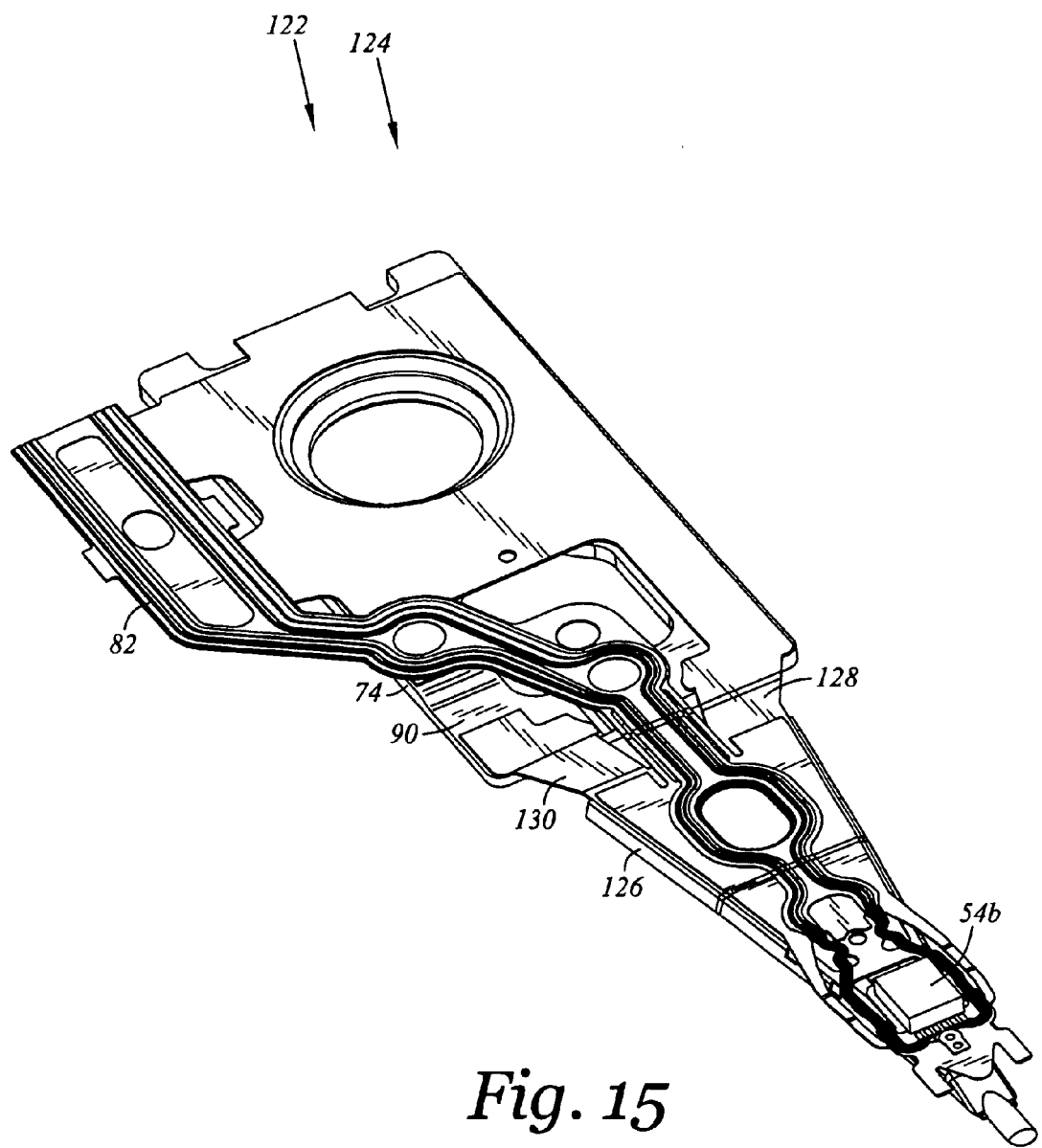
FIG. 15 is the head gimbal assembly of FIG. 14 as assembled.
Figure 16:
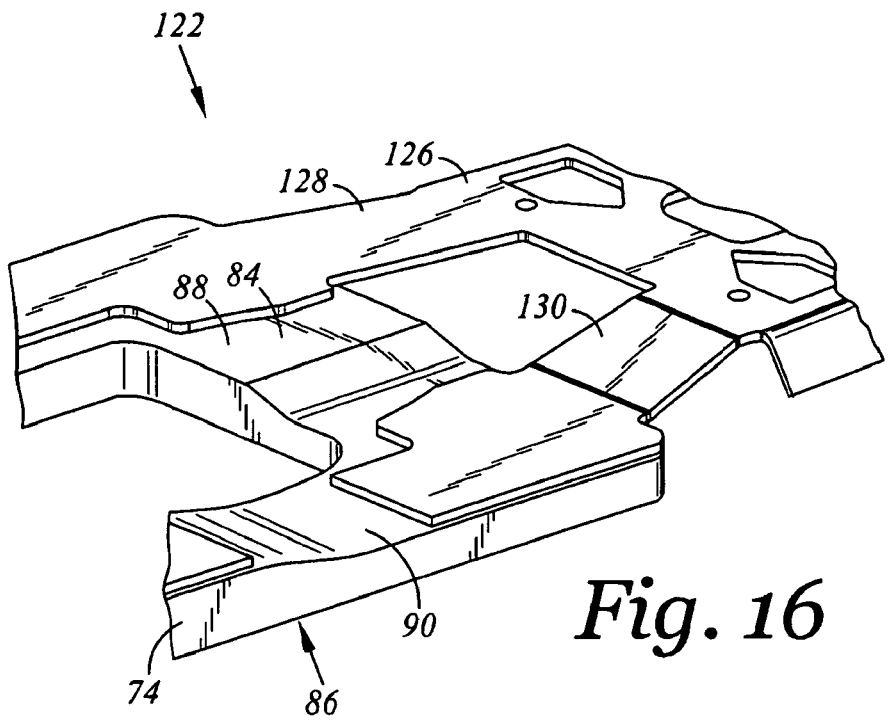
FIG. 16 is an enlarged perspective view of a portion of the head gimbal assembly of FIG. 15 as viewed from another angle.

Referring now to FIGS. 14-16, there is depicted another embodiment. Similar reference numerals as those in relation to the embodiments shown in FIGS. 3-7 are used to indicate similarly configured components.

FIGS. 14-16 depict views similar to those portions of the head stack assembly 50*b* respectively of FIGS. 3, 4 and 7. In this embodiment, there is depicted a head gimbal assembly 122 that includes a suspension assembly 124 and the read head 54*b*. The head gimbal assembly 122 includes a load beam 126 that includes a first hinge arm 128 and a second hinge arm 130. In this embodiment, the first and second hinge arms 128, 130 and the load beam 126 are a single component having material continuity rather than an assembly of subcomponents. As a result this embodiment avoids any manufacturing steps that involve attachment of the first or second hinge arms 128, 130 to the load beam 126. This embodiment also includes the second hinge arm 130 that includes an angulation and thereby avoids use of any shim.

Figure 17:
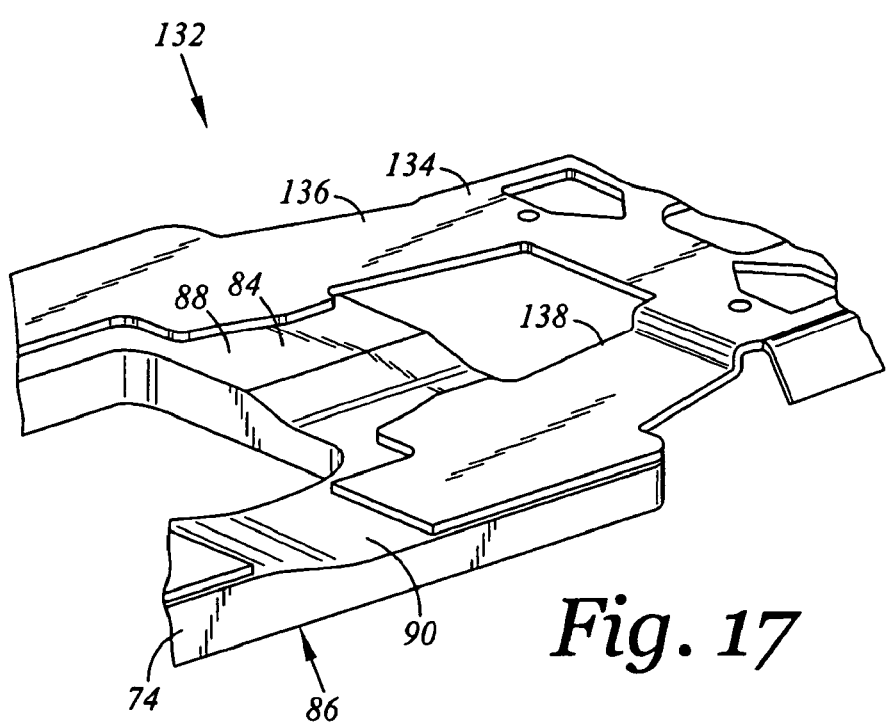
FIG. 17 is an enlarged top perspective view of a portion of a head gimbal assembly of another embodiment of the present invention.
Figure 18:
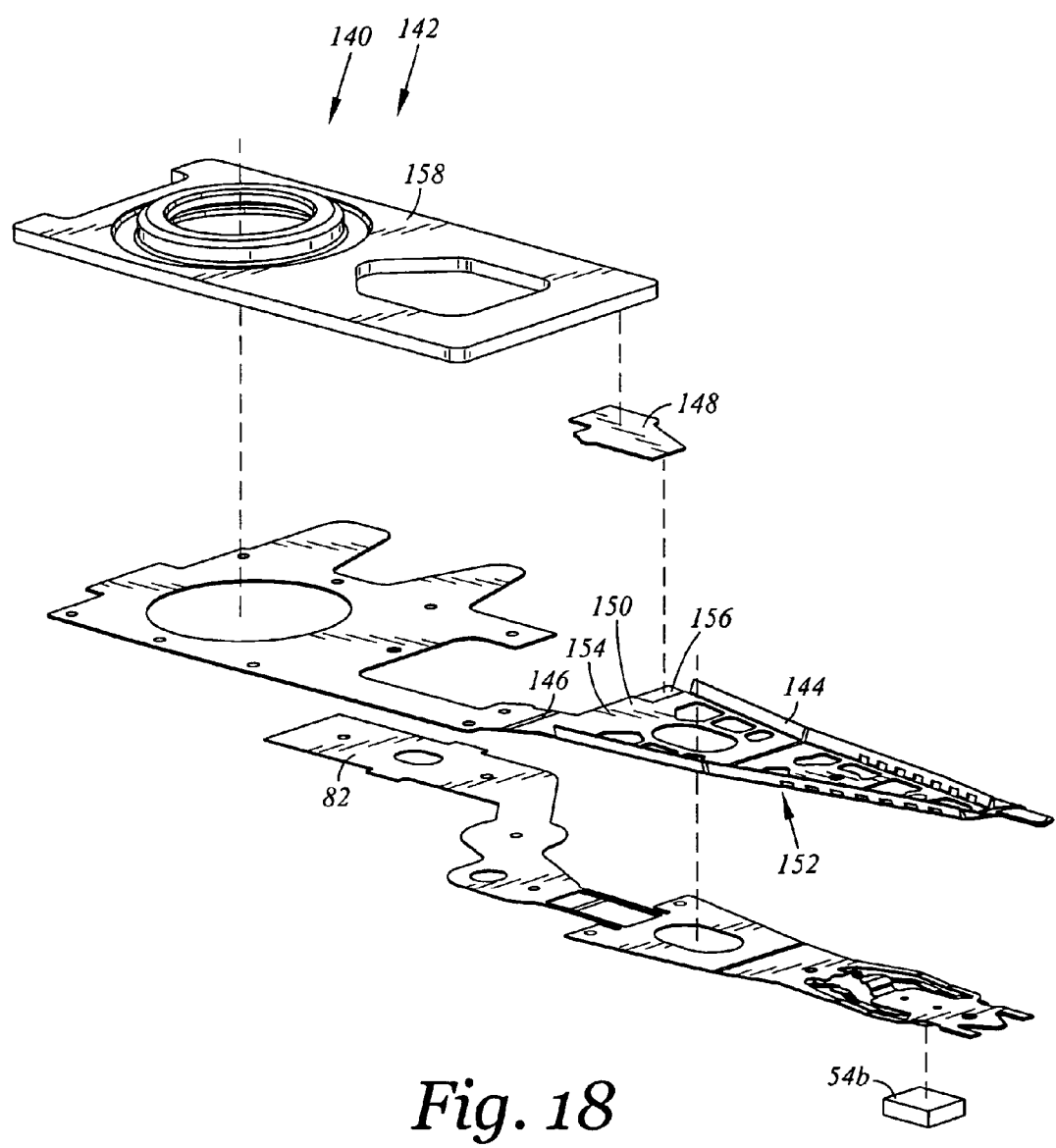
FIG. 18 is an enlarged exploded perspective bottom view of a head gimbal assembly of the head stack assembly of the disk drive of FIG. 1, of another embodiment of the present invention.
Figure 19:
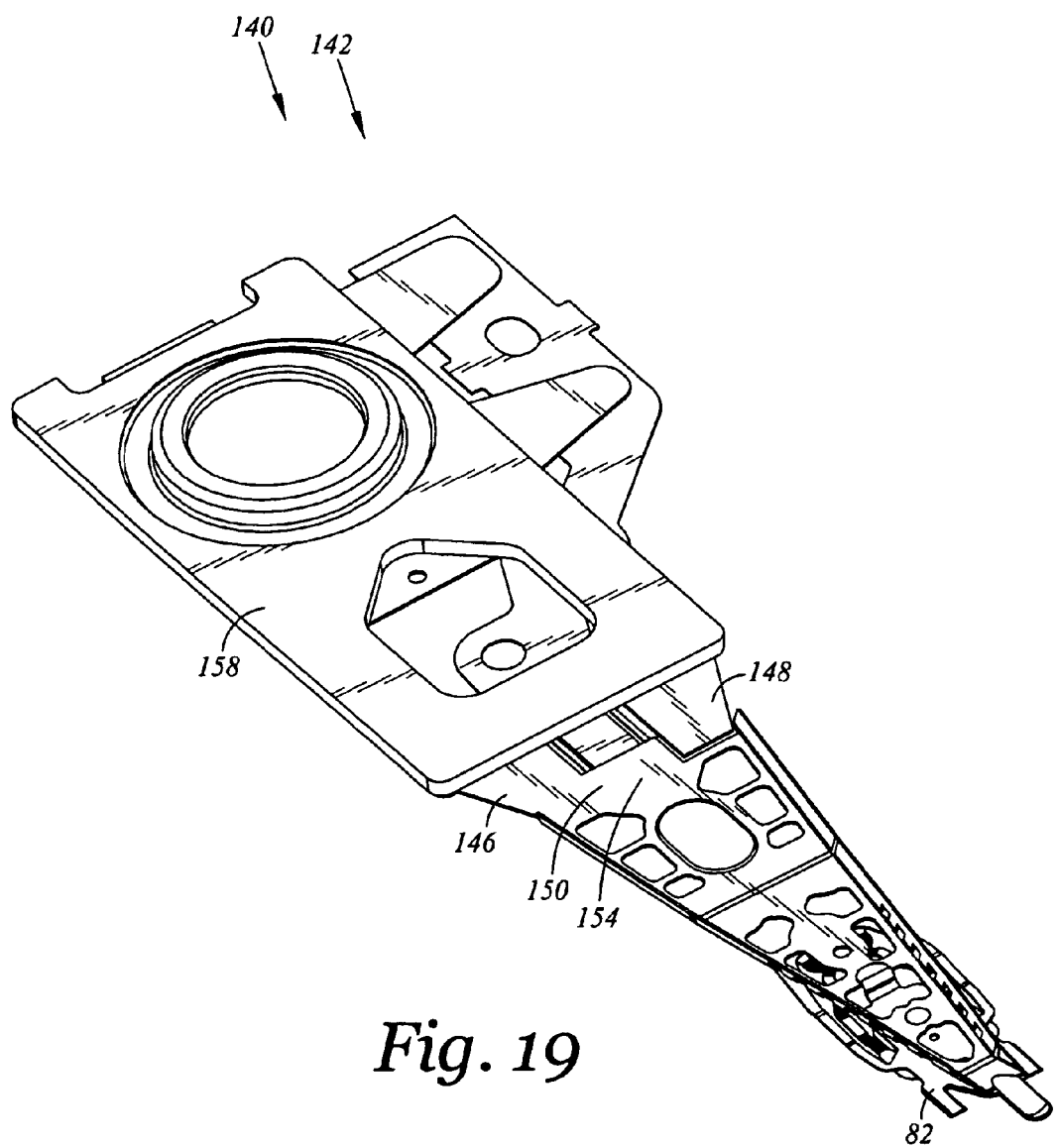
FIG. 19 is the head gimbal assembly of FIG. 18 as assembled.
Figure 20:
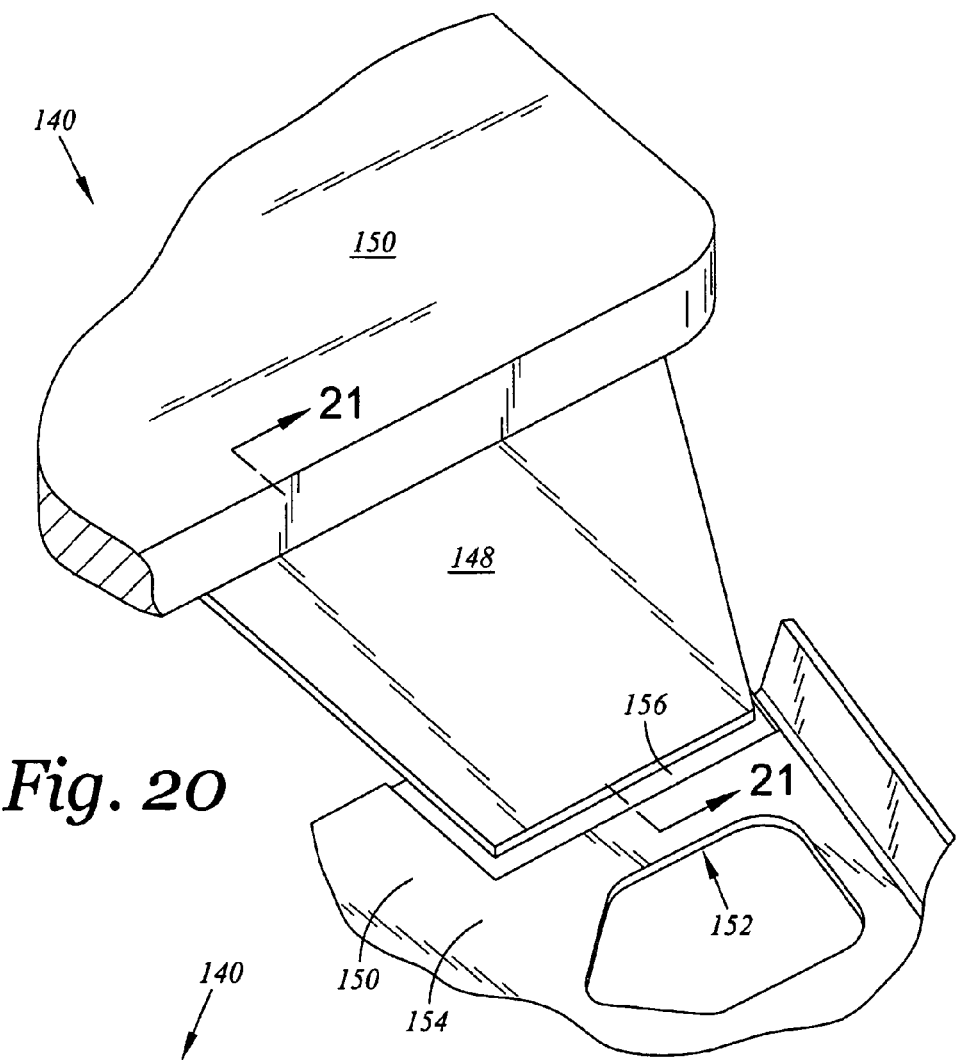
FIG. 20 is an enlarged perspective view of a portion of the head gimbal assembly of FIG. 19 as viewed from another angle.
Figure 21:
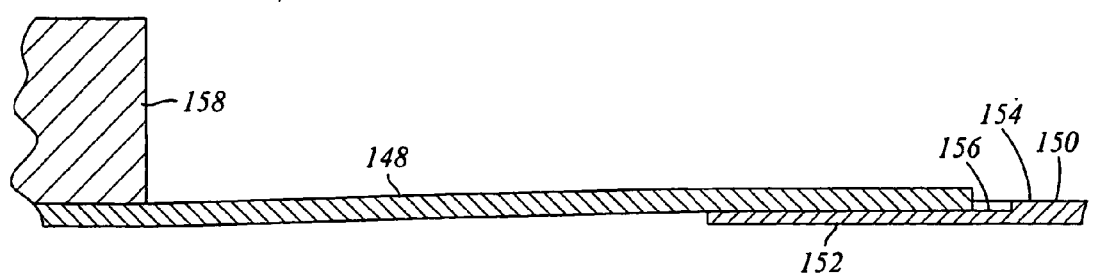
FIG. 21 is a cross-sectional side view of the portion of the head gimbal assembly of FIG. 20 as viewed along axis 21-21 of FIG. 20.
Figure 22:
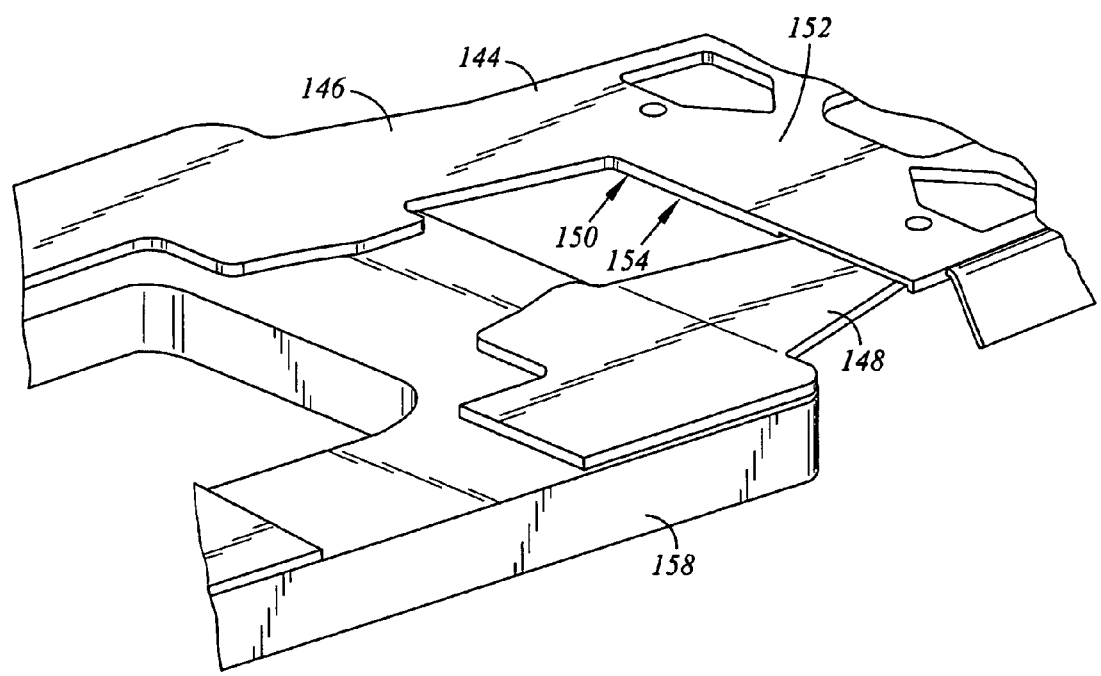
FIG. 22 is an enlarged top perspective view of a portion of the head gimbal assembly of FIG. 19.
Figure 23:
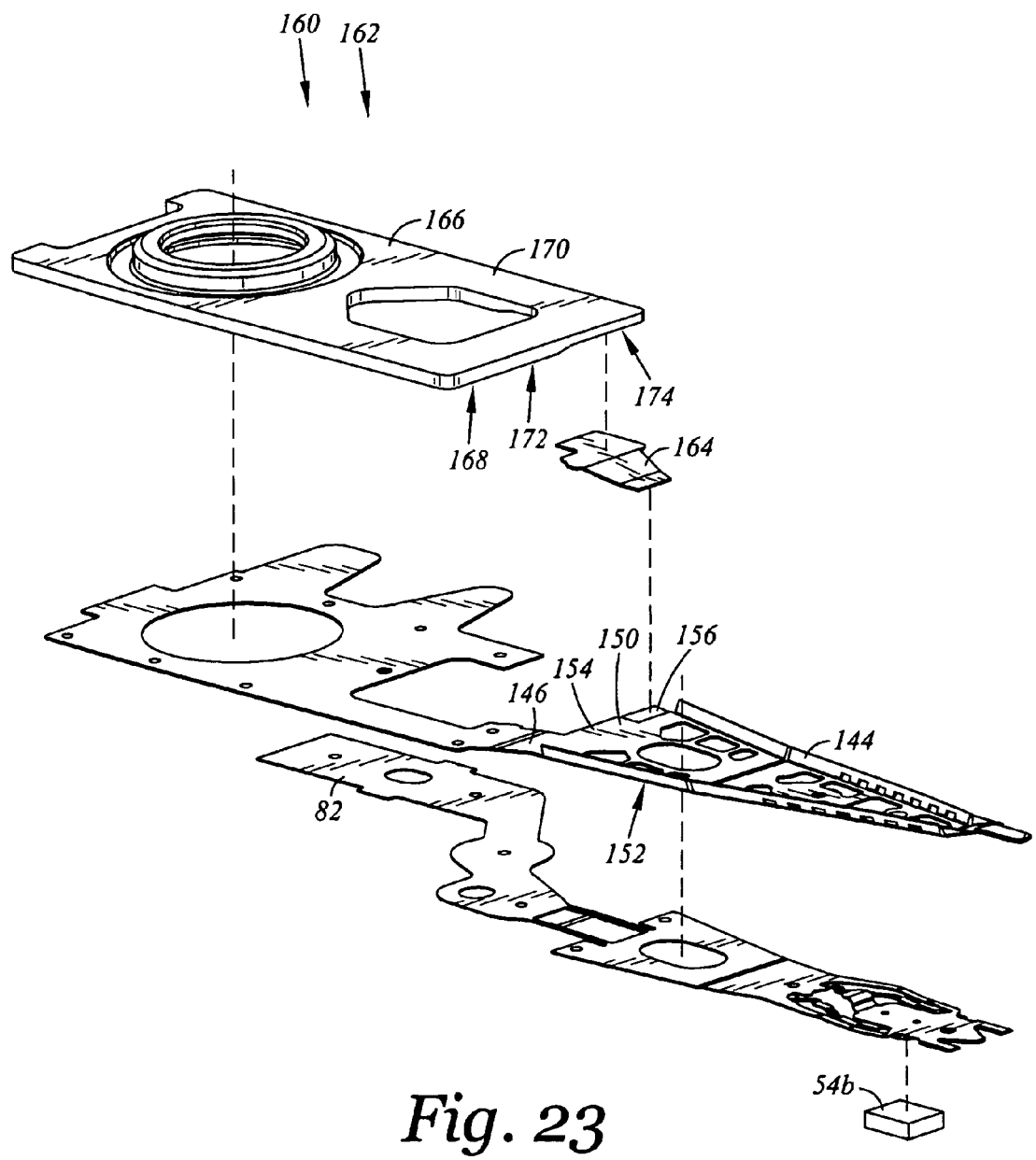
FIG. 23 is an enlarged exploded perspective bottom view of a head gimbal assembly of the head stack assembly of the disk drive of FIG. 1, of another embodiment of the present invention.
Figure 24:
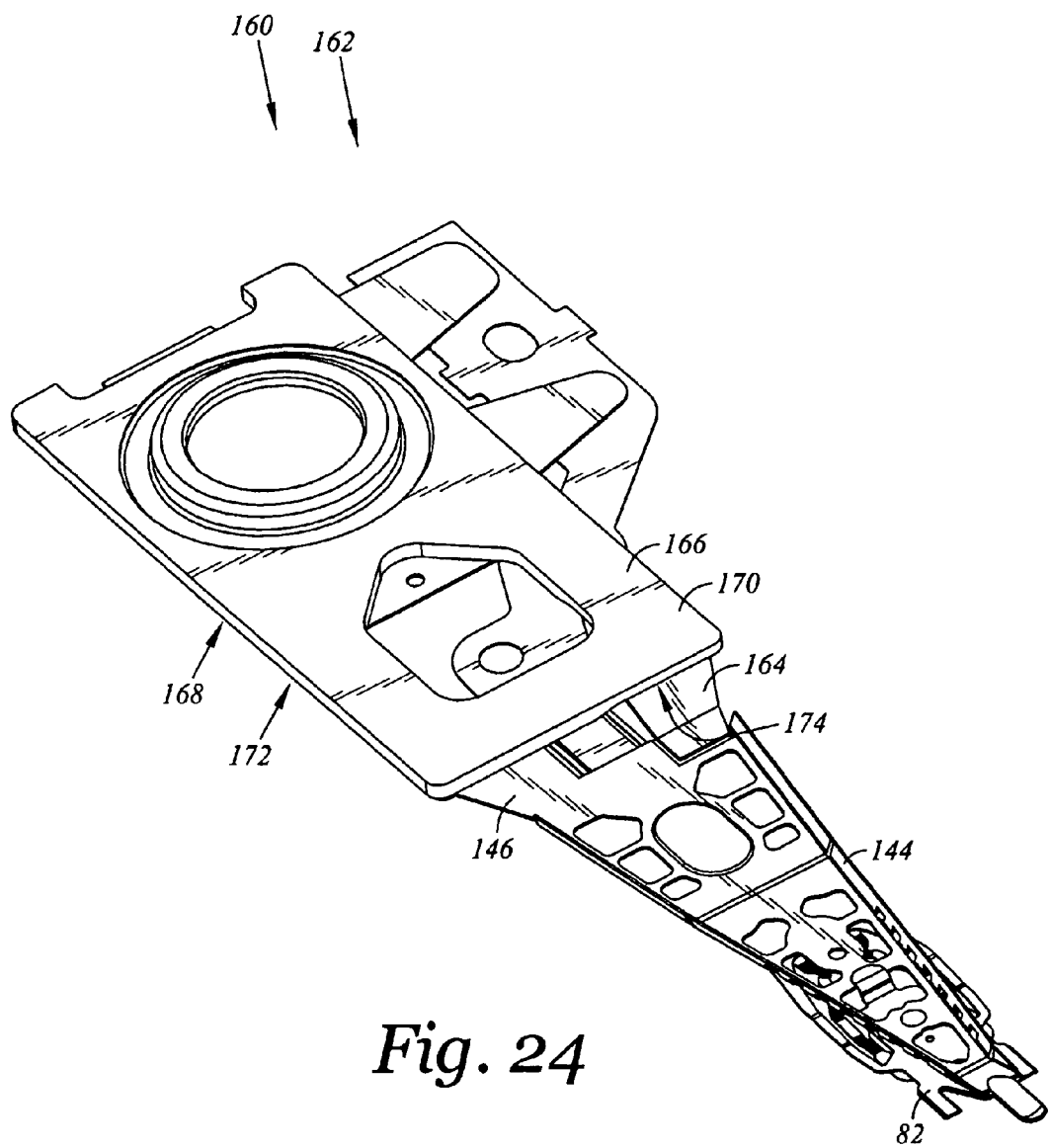
FIG. 24 is the head gimbal assembly of FIG. 23 as assembled.
Figure 25:
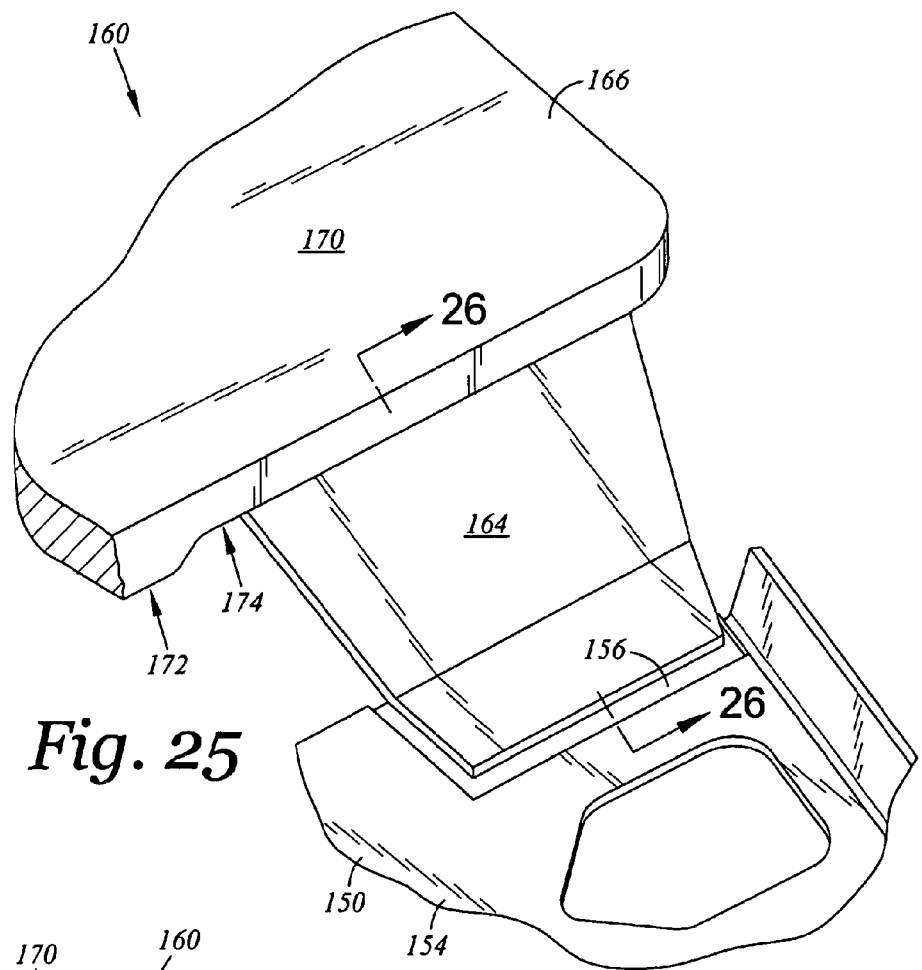
FIG. 25 is an enlarged perspective view of a portion of the head gimbal assembly of FIG. 24 as viewed from another angle.
Figure 26:
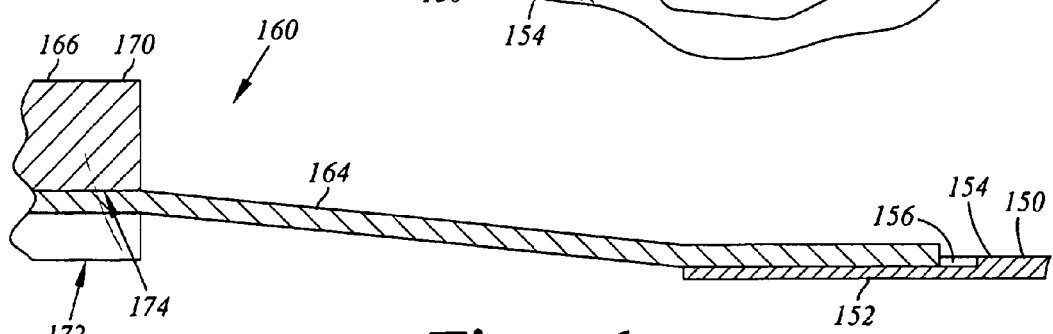
FIG. 26 is a cross-sectional side view of the portion of the head gimbal assembly of FIG. 25 as viewed along axis 26-26 of FIG. 25.
Figure 27:
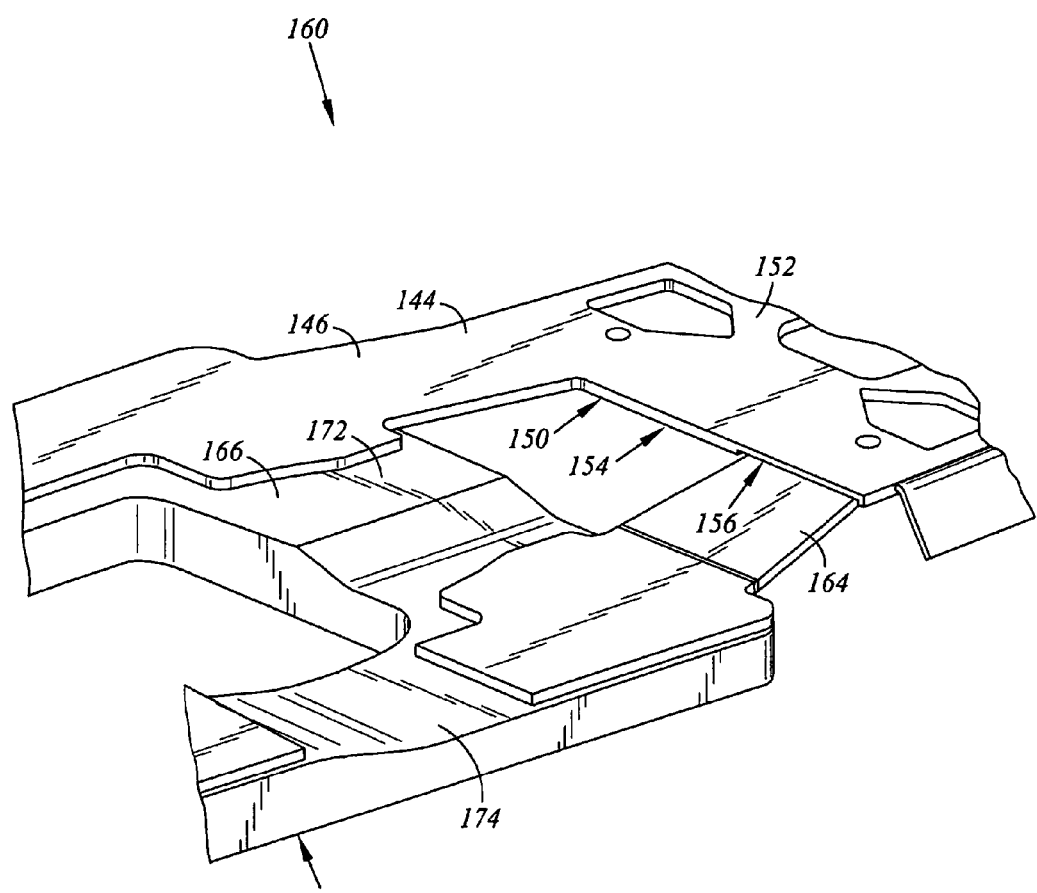
FIG. 27 is an enlarged top perspective view of a portion of the head gimbal assembly of FIG. 24.

Referring now to FIG. 17, there is depicted another embodiment. Similar reference numerals as those in relation to the embodiments shown in FIGS. 14-16 are used to indicate similarly configured components.

FIG. 17 depicts a view similar to that portion of the head stack assembly 50b of FIG. 16. In this embodiment, there is depicted a head gimbal assembly 132 that includes a load beam 134 that includes a first hinge arm 136 and a second hinge arm 138. In this embodiment, the first and second hinge arms 136, 138 and the load beam 134 are a single component having material continuity rather than an assembly of subcomponents. Further in this embodiment the second hinge arm 138 includes a stepped-like angulation to facilitate an offset of the second hinge arm 138 from the first hinge arm 136 and the load beam 134.

Referring now to FIGS. 18-22, there is depicted another embodiment. Similar reference numerals as those in relation to the embodiments shown in previous figures are used to indicate similarly configured components. In this embodiment there is depicted a head gimbal assembly 140 that includes a suspension assembly 142 and the read head 54b. The head gimbal assembly 140 includes a load beam 144, a first hinge arm 146, a second hinge arm 148, and a base plate 158. The load beam 144 includes a first load beam side 150 and an opposing second load beam side 152. The first load beam side 150 includes a main load beam surface 154 and a recessed load beam surface 156 parallel to and offset from the main load beam surface 154. The second hinge arm 148 is attached to the load beam 144 at the recessed load beam surface 156. The first and second hinge arms 146, 148 are further attached to the base plate 158. The read head 54b is mechanically coupled to the load beam 144.

In this embodiment, the second hinge arm 148 is flat. Though not required, in the particular embodiment shown the first hinge arm 146 and the load beam 144 are both a single component having material continuity rather than an assembly of subcomponents.

The load beam 144 has a first thickness at the main load beam surface 154 and a second thickness at the recessed load beam surface 156 that is less than the first thickness. The recessed load beam surface 156 may be formed in the load beam 144 through various techniques, for example the recessed load beam surface 156 may be a partially etched surface. The recessed load beam surface 156 may be offset from the main load beam surface 154 in the range of 30 microns to 100 microns for a sample range.

Referring now to FIGS. 23-27 there is depicted another embodiment. Similar reference numerals as those in relation to the embodiments shown in previous figures are used to indicate similarly configured components. In this embodiment there is depicted a head gimbal assembly 160 that includes a suspension assembly 162 and the read head 54b. The head gimbal assembly 160 includes the load beam 144 with the first hinge arm 146, a second hinge arm 164, and a base plate 166. As mentioned above, the load beam 144 includes the first load beam side 150 and the second load beam side 150. The first load beam side 150 includes the main load beam surface 154 and the recessed load beam surface 156 parallel to and offset from the main load beam surface 154.

The base plate 166 includes a first base plate side 168 and an opposing second base plate side 170. The first base plate side 168 includes a main base plate surface 172 and a recessed base plate surface 174 parallel to and offset from the main base plate surface 172. The first hinge arm 146 is attached to the base plate 166 at the main base plate surface 172. In addition, the first hinge arm 146 and the load beam 144 are both a single component having material continuity rather than an assembly of subcomponents. The second hinge arm 164 is attached to the load beam 144 at the recessed load beam surface 156. Further, the second hinge arm 164 is attached to the base plate 166 at the recessed base plate surface 174. In this embodiment the second hinge arm 164 includes an angulation between the locations where the second hinge arm 164 is attached to the recessed base plate surface 174 and the recessed load beam surface 156.

What is claimed is:

1. A disk drive comprising:
an actuator having at least one actuator arm; and
a suspension assembly attached to the at least one actuator arm, the suspension assembly comprising:
a base plate having a first base plate layer, the first base plate layer including a first base plate side and an opposing second base plate side, the first base plate side having a main base plate surface and a recessed base plate surface parallel to and offset from the main base plate surface;
a first hinge arm attached to the main base plate surface;
a second hinge arm attached to the recessed base plate surface;
a load beam, the first and second hinge arms being further attached to the load beam; and
a flexure including a head mounting surface coupled to the load beam;
wherein the base plate has a first thickness at the main base plate surface and a second thickness at the recessed base plate surface that is the same as the first thickness.

2. The disk drive of claim 1 wherein the recessed base plate surface is offset from the main base plate surface in the range of 30 microns to 100 microns.

3. The disk drive of claim 1 wherein the second hinge arm is offset in relation to the load beam where the second hinge arm is attached to the recessed base plate surface.

4. The disk drive of claim 1 wherein the recessed base plate surface is offset from the main base plate surface by an amount equal to a thickness of the load beam.

5. The disk drive of claim 1 further including a shim between the second hinge arm and the load beam, the shim having a shim thickness in the range of 15 microns to 70 microns.

6. The disk drive of claim 5 wherein the recessed base plate surface is offset from the main base plate surface by an amount equal to the sum of a thickness of the load beam and the shim thickness.

7. The disk drive of claim 1 wherein the load beam has a first load beam side and an opposing second load beam side, the first load beam side has a main load beam surface and a recessed load beam surface parallel to and offset from the main load beam surface, the flexure extends along the base plate and the load beam.

8. The disk drive of claim 7 wherein the first hinge arm is attached to the main load beam surface.

9. The disk drive of claim 7 wherein the second hinge arm is attached to the recessed load beam surface.

10. A suspension assembly for use in a disk drive, the suspension assembly comprising:
a base plate having a first base plate layer, the first base plate layer including a first base plate side and an opposing second base plate side, the first base plate side having a main base plate surface and a recessed base plate surface parallel to and offset from the main base plate surface;

a first hinge arm attached to the main base plate surface;

a second hinge arm attached to the recessed base plate surface;

a load beam, the first and second hinge arms being further attached to the load beam; and a flexure including a head mounting surface coupled to the load beam;

wherein the base plate has a first thickness at the main base plate surface and a second thickness at the recessed base plate surface that is the same as the first thickness.

11. The suspension assembly of claim 10 wherein the recessed base plate surface is offset from the main base plate surface in the range of 30 microns to 100 microns.

12. The suspension assembly of claim 10 wherein the first hinge arm and the load beam are both a single component having material continuity rather than an assembly of subcomponents.

13. The suspension assembly of claim 12 wherein the second hinge arm and the load beam are both a single component having material continuity rather that an assembly of subcomponents.

14. The suspension assembly of claim 10 wherein the second hinge arm is offset in relation to the load beam where the second hinge arm is attached to the recessed base plate surface.

15. The suspension assembly of claim 10 wherein the recessed base plate surface is offset from the main base plate surface by an amount equal to a thickness of the load beam.

16. The suspension assembly of claim 10 further including a shim between the second hinge arm and the load beam, the shim having a shim thickness in the range of 15 microns to 70 microns.

17. The suspension assembly of claim 16 wherein the recessed base plate surface is offset from the main base plate surface by an amount equal to the sum of a thickness of the load beam and the shim thickness.

18. The suspension assembly of claim 10 wherein the load beam has a first load beam side and an opposing second load beam side, the first load beam side has a main load beam surface and a recessed load beam surface parallel to and offset from the main load beam surface, the flexure extends along the base plate and the load beam.

19. The suspension assembly of claim 18 wherein the first hinge arm is attached to the main load beam surface.

20. The suspension assembly of claim 18 wherein the second hinge arm is attached to the recessed load beam surface.

* * * * *